US012321884B1

(12) United States Patent
Viathyanathan et al.

(10) Patent No.: US 12,321,884 B1
(45) Date of Patent: Jun. 3, 2025

(54) INTELLIGENT ORDER CONSOLIDATION

(71) Applicant: Target Brands, Inc., Minneapolis, MN (US)

(72) Inventors: Visagan Viathyanathan, Minneapolis, MN (US); Aaron Riekenberg, Minneapolis, MN (US); Anju Yadav, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/530,091

(22) Filed: Dec. 5, 2023

(51) Int. Cl.
*G06Q 10/083* (2024.01)
*G06Q 10/087* (2023.01)

(52) U.S. Cl.
CPC ......... *G06Q 10/083* (2013.01); *G06Q 10/087* (2013.01)

(58) Field of Classification Search
CPC ............................ G06Q 10/083; G06Q 10/087
See application file for complete search history.

(56) References Cited

U.S. PATENT DOCUMENTS

| | | | |
|---|---|---|---|
| 7,295,990 B1 | 11/2007 | Braumoeller et al. | |
| 8,498,888 B1 | 7/2013 | Raff et al. | |
| 9,466,045 B1* | 10/2016 | Kumar | G06Q 10/087 |
| 11,151,496 B2 | 10/2021 | Mahajan et al. | |
| 2001/0027471 A1 | 10/2001 | Paulose et al. | |
| 2003/0093388 A1 | 5/2003 | Albright | |
| 2010/0274610 A1* | 10/2010 | Andersen | G06Q 10/087 705/28 |
| 2011/0022592 A1* | 1/2011 | Brindisi | G06F 15/0283 707/E17.084 |

(Continued)

FOREIGN PATENT DOCUMENTS

KR     102451779 B1    10/2022

OTHER PUBLICATIONS

Yuankai et al., "Order consolidation for the last-mile split delivery in online retailing" Transportation Research Part E: Logistics and Transportation Review vol. 122, Feb. 2019, pp. 309-327 (available at: https://www.sciencedirect.com/science/article/pii/S1366554518304046) (Year: 2019) (Year: 2019).*

*Primary Examiner* — Shannon S Campbell
*Assistant Examiner* — Stephanie S. Wallick
(74) *Attorney, Agent, or Firm* — Merchant and Gould, PC

(57) ABSTRACT

Disclosed are systems and methods for improved consolidation of orders at a particular node for each item in a guest shopping cart, including an intelligent node inclusion application/service. In some examples, a predetermined number of the closest store nodes and a predetermined number of online nodes are analyzed using an Available to Promise (ATP) service to determine whether multiple items in a cart could be shipped together (consolidated) to reduce shipping expense. Additionally, data corresponding to all items in the cart will be passed so the intelligent node inclusion (INI) service can determine a predetermined number of common shipping locations. A minimum number of "best" nodes from among all nodes may be identified, which may include nodes outside the closest nodes geographically. A downstream promise fulfillment application can then determine whether the cost of local or further fulfillment (with consolidation) is worthwhile.

22 Claims, 13 Drawing Sheets

(56) References Cited

U.S. PATENT DOCUMENTS

| | | | |
|---|---|---|---|
| 2017/0236083 A1* | 8/2017 | Granero | G06Q 10/063 705/7.25 |
| 2017/0330123 A1* | 11/2017 | Deshpande | G06Q 10/087 |
| 2018/0158014 A1* | 6/2018 | Chandra | G06F 16/24564 |
| 2018/0314999 A1* | 11/2018 | Nemati | G06Q 10/087 |
| 2021/0150474 A1 | 5/2021 | Park et al. | |
| 2021/0158272 A1* | 5/2021 | Barr | G06Q 10/087 |
| 2022/0067815 A1* | 3/2022 | Reynolds | G06Q 30/0637 |
| 2022/0147908 A1* | 5/2022 | Yag | G06N 20/00 |
| 2023/0004928 A1* | 1/2023 | L'Orange | G06Q 10/087 |

\* cited by examiner

INTELLIGENT ORDER CONSOLIDATION

BACKGROUND

An enterprise may wish to provide a user with a consolidated order (for example, and online order). A user may have more than one item in an online shopping cart, and the enterprise process may determine whether or how to consolidate multiple of the items from a single node (for example, a store, warehouse, or similar facility) or to fulfill each item from a separate node. In systems where a number of closest store nodes and another number of closest online nodes are analyzed to determine whether multiple items in a cart could be shipped together (consolidated) to reduce shipping expense, the numbers of nodes analyzed may be limited by system performance because, at higher node numbers, performance of the analysis system degrades. However, in systems that limit the analysis in this way, opportunities for improved shipment efficiencies might be missed.

SUMMARY

In general, the subject matter of this disclosure relates to an improvement in the process of analyzing how to consolidate orders at a particular node (e.g., a store node or an online node) for each item in a guest shopping cart, including an intelligent node inclusion (INI) application/service. In some examples, a predetermined number of the closest store nodes and a predetermined number of online nodes are analyzed using an Available to Promise (ATP) service to determine whether multiple items in a cart could be shipped together (consolidated) to reduce shipping expense. In some examples, a middle layer in the call to ATP is introduced. At the time the user initiates checkout of the online cart, a request will issue to obtain availability and fulfillment information for all items in a cart. In addition to the current ATP-only process, the set of all item numbers corresponding to all items in the cart will be passed so the intelligent node inclusion (INI) service can determine a predetermined number of common shipping locations. The INI service implements an algorithm to determine when common nodes should be added to the ATP response. A minimum number of "best" nodes from among all nodes may be identified, which may include nodes outside the closest nodes geographically. A downstream promise fulfillment application can then determine whether the cost of local or further fulfillment (with consolidation) is worthwhile. Because individual item availability (at each of a plurality of nodes) is precomputed and maintained in a forward cache within ATP, calculation of collective availability can be done quickly. This provides an additional computing efficiency at least because individual availability is not required to be calculated or recalculated each time (it is precomputed). In some examples, smart rules may be applied at a Promise Consolidation system to prioritize nodes (for example, nodes outside of a geographic area, such as a geographic area that includes a delivery destination for the items) based on excess capacity for particular items that are deemed non-essentials, which allows draw-down of excess capacity from outside the region while minimizing risk that a local node with lower capacity will run out of stock of item(s) and not be able to meet customer demand. In some examples, machine learning processes may use various order patterns, guest and cart profiles, historical product/node performance (for example, timing) and profitability, as well as shipping expense information, and combines product attributes, location attributes, and guest to source node attributes to provide additional prioritization information to the INI and Promise Modules.

Accordingly, the present application describes a computing system, comprising: at least one processor; and at least one memory storing computer-executable instructions for generating a consolidation shipping option, the computer-executable instructions when executed by the at least one processor causing the computer to: receive input data from a user interface accessible from a user computing device, the input data indicating that: an online cart includes at least a first item and a second item; and a common shipping destination for the plurality of items. The instructions further cause the computer to locate a first predetermined number of nodes of an overall list of eligible nodes that are within a predetermined distance of the shipping destination; for the first item, identify a first set of nodes within the predetermined distance that has the first item in stock, based on a node available inventory at each node; and for the second item, identify a second set of nodes within the predetermined distance that has the second item in stock, based on the node available inventory at each node. Further, the instructions cause the computer to determine, based on the first set of nodes and the second set of nodes, a first common list of nodes that have both the first item and the second item in stock; for each of the overall list of eligible nodes, select a second common list of nodes that has both the first item and the second item in stock, based on the node available inventory at each node, wherein the second common list of nodes includes a second predetermined number of nodes; combine the first common list of nodes and the second common list of nodes into a third common list of nodes; sort the third common list of nodes by distance cluster; and apply one or more business rules to third common list of nodes. Based at least on the distance cluster and the business rules, determine whether any nodes of the third common list of nodes can provide delivery of both the first item and the second item within a predetermined delivery time threshold; The instructions further cause the computer to, upon determination that at least one node of the third common list of nodes can provide delivery of both the first item and the second item within the predetermined delivery time threshold, generate the consolidation shipping option; and transmit the consolidation shipping option to the user computing device for display on the user interface.

The present application describes a method, comprising: receiving input data from a user interface accessible from a user computing device, the input data indicating that: an online cart includes at least a first item and a second item; and a common shipping destination for the plurality of items. A first predetermined number of nodes of an overall list of eligible nodes that are within a predetermined distance of the shipping destination are located; for the first item, identifying a first set of nodes within the predetermined distance that has the first item in stock, based on a node available inventory at each node; for the second item, identifying a second set of nodes within the predetermined distance that has the second item in stock, based on the node available inventory at each node; and determining, based on the first set of nodes and the second set of nodes, a first common list of nodes that have both the first item and the second item in stock. For each of the overall list of eligible nodes, a second common list of nodes that has both the first item and the second item in stock is selected, based on the node available inventory at each node, wherein the second common list of nodes includes a second predetermined number of nodes. The method further includes combining the first common list of nodes and the second common list of nodes into a third common list of nodes; sorting the third common list of nodes by distance cluster; and applying one or more business rules to third common list of nodes. Further, the method includes, based at least on the distance cluster and the business rules, determining whether any nodes of the third common list of nodes can provide delivery of both the first item and the second item within a predetermined delivery time threshold; upon determination that at least one node of the third common list of nodes can provide delivery of both the first item and the second item within the predetermined delivery time threshold, generating a consolidation shipping option; and transmitting the consolidation shipping option to the user computing device for display on the user interface.

The present application describes a system comprising: a distance-based item availability platform comprising a first computer system configured to: receive input data from a user interface accessible from a user computing device, the input data indicating that: an online cart includes at least a first item and a second item; and a common shipping destination for the plurality of items; locate a first predetermined number of nodes of an overall list of eligible nodes that are within a predetermined distance of the shipping destination; for the first item, identify a first set of nodes within the predetermined distance that has the first item in stock, based on a node available inventory at each node; for the second item, identify a second set of nodes within the predetermined distance that has the second item in stock, based on the node available inventory at each node; determine, based on the first set of nodes and the second set of nodes, a first common list of nodes that have both the first item and the second item in stock. The system further comprises a consolidation node selection platform, executing on a second computer system communicatively connected to the first computer system, instructions to: receive the first common list of nodes from the first computer system; for each of the overall list of eligible nodes, select a second common list of nodes that has both the first item and the second item in stock, based on the node available inventory at each node, wherein the second common list of nodes includes a second predetermined number of nodes; combine the first common list of nodes and the second common list of nodes into a third common list of nodes; sort the third common list of nodes by distance cluster; apply one or more business rules to third common list of nodes; based at least on the distance cluster and the business rules, determine whether any nodes of the third common list of nodes can provide delivery of both the first item and the second item within a predetermined delivery time threshold; upon determination that at least one node of the third common list of nodes can provide delivery of both the first item and the second item within the predetermined delivery time threshold, generate a consolidation shipping option; and transmit the consolidation shipping option to the user computing device for display on the user interface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
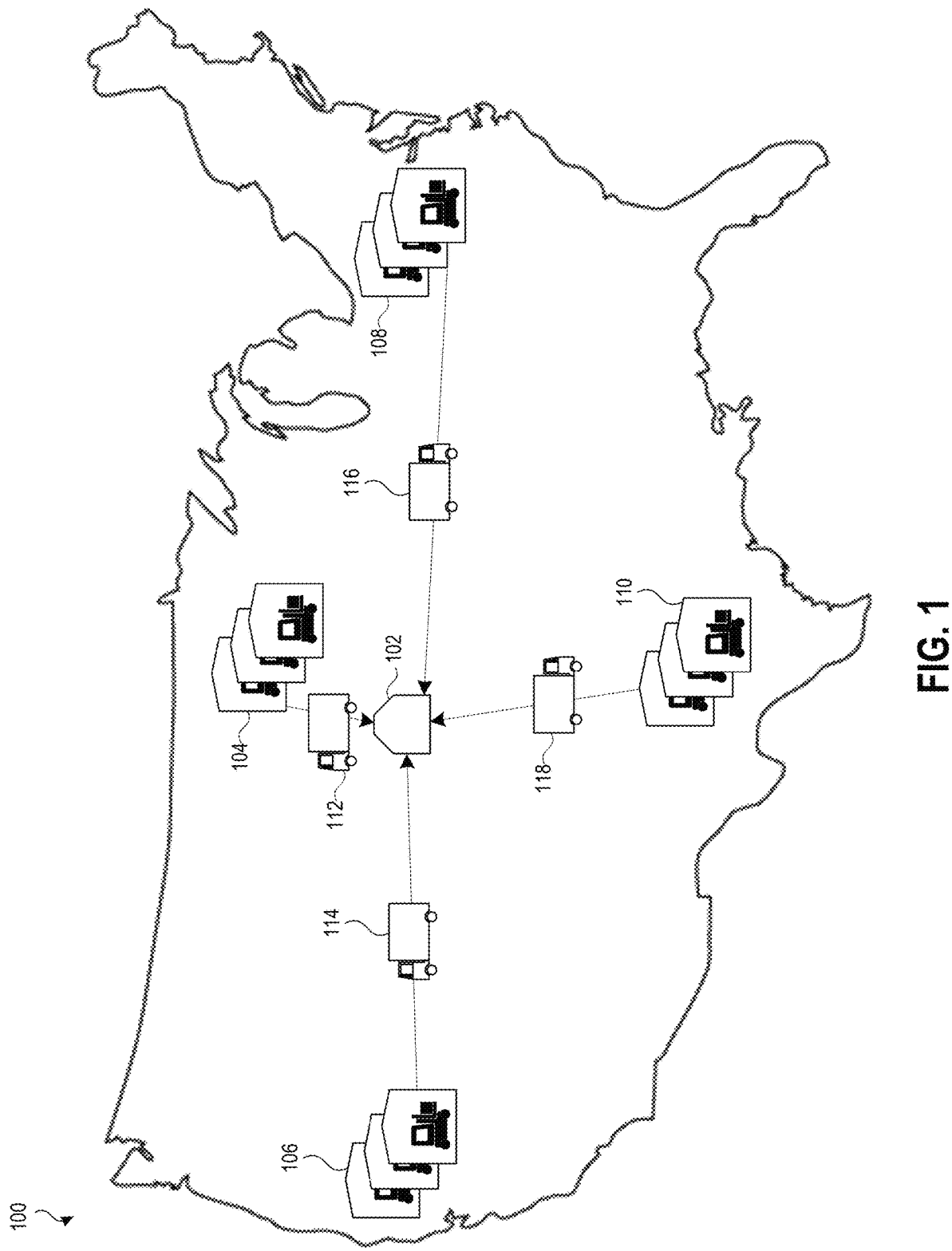
FIG. 1 illustrates an example distribution system for possible deliveries of an item from one or more nodes to a destination, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An enterprise may wish to provide a user (for example, a customer or guest who wishes to purchase an item/product via an online or in-app shopping cart) with a consolidated order. A user may have more than one item in an online shopping cart, and the enterprise process may determine whether or how to consolidate multiple of the items from a single node (for example, a store, warehouse, or similar facility) or to fulfill each item from a separate node. In systems where a number of closest store nodes and another number of closest online nodes are analyzed to determine whether multiple items in a cart could be shipped together (consolidated) to reduce shipping expense, the numbers of nodes analyzed may be limited by system performance because, at higher node numbers, performance of the analysis system degrades. However, in systems that limit the analysis in this way, opportunities for improved shipment efficiencies might be missed.

Consolidation of the order in appropriate situations may result in a cost savings for the user and/or the enterprise. For example, consolidating orders may mean that multiple items may be packaged in the same shipping box or bag (translating to a savings of packing and materials costs, and further leading to less waste/recycling material being generated). In some examples, consolidated items (whether they are in the same or different packaging) may be delivered on the same vehicle and/or same delivery route, thereby reducing transportation costs (and reducing vehicle emissions). Consolidation may, in some examples, result in a quicker/sooner delivery of the items. In other examples, consolidation may result in a longer/later delivery of the items. In such examples, users may be presented with a discount or other promotional action if they choose a consolidated shipping option, to incentivize the user. In some examples, the discount provided is a static value; in other examples, the value of the discount provided is related to a value of the reduction in transportation costs achieved by the consolidation.

In examples, the subject matter of this disclosure relates to an improvement in the process of analyzing how to consolidate orders at a particular node (e.g., a store node or an online node) for each item in a guest shopping cart, including an intelligent node inclusion (INI) application/service. In some examples, a predetermined number of the closest store nodes (for example, 40 closest store nodes) and a predetermined number of online nodes (for example, 18 closest online nodes) are analyzed using an Available to Promise (ATP) service to determine whether multiple items in a cart could be shipped together (consolidated) to reduce shipping expense. These predetermined numbers of nodes may be selected because, at higher node numbers, performance of the system degrades.

In some examples, a middle layer in the call to ATP is introduced. At the time the user initiates checkout of the online cart, a request will issue to obtain availability and fulfillment information for all items in a cart (up to a predetermined maximum number of cart items, for example, up to 25 cart items). In addition to the current process, (in which an inventory availability will be determined for one item in the cart across the 40 nearest shipping locations, for example (to a Shipping Methods (SM) service, which calls ATP)), the set of all item numbers corresponding to all items in the cart will be passed so the intelligent node inclusion (INI) service can determine a predetermined number of common shipping locations (for example, up to 10 common shipping locations).

The INI service implements an algorithm to determine when common nodes should be added to the ATP response. The algorithm involves looping through all items in the cart, building a mapping of a location identifier (ID) to the set of common item identifiers (item ID) (e.g., identifying a specific item type carried by the entity) with shipping availability, a reverse mapping of the item IDs to location IDs with common availability, and then the item ID and common location ID set is selected with a max number of item IDs for a given location ID. The top X number (for example, up to 10) nodes are returned. Finally, nodes are sorted by cluster based on distance. Each location is marked as true or false as being within the set of ranked solutions. Therefore, according to an example, a minimum of 10 "best" nodes from among all nodes may be identified, which may include nodes outside the closest 40 nodes geographically. A downstream promise fulfillment application can then determine whether the cost of local or further fulfillment (with consolidation) is worthwhile.

Because individual item availability (at each of a plurality of nodes) is precomputed and maintained in a forward cache within ATP, calculation of collective availability can be done quickly.

In some examples, smart rules may be applied at a Promise Consolidation system to prioritize nodes (for example, nodes outside of a geographic area, such as a geographic area that includes a delivery destination for the items) based on excess capacity for particular items that are deemed non-essentials, which allows draw-down of excess capacity from outside the region while minimizing risk that a local node with lower capacity will run out of stock of item(s) and not be able to meet customer demand. In some examples, nodes with high inventory outside a region may be prioritized over nodes with low inventory, and a guest may be presented with an option for slower shipping or an automatic consolidation option to meet the delivery date and save shipping expense. Further, nodes with all items present may be prioritized even if outside a geographic area over local nodes that require (downstream) sortation center-based consolidation.

In some examples, machine learning processes may use various order patterns, guest and cart profiles, historical product/node performance (for example, timing) and profitability, as well as shipping expense information, and combines product attributes, location attributes, and guest to source node attributes to provide additional prioritization information to the INI and Promise Modules.

An advantageous effect of the new system is that additional potential shipment nodes may be considered from across the entire supply chain, which can increase the extent of consolidation. In a particular example, the number of nodes at which the ATP service request is analyzed was increased from 40 to 100 node locations. This caused a significant spike in central processing unit (CPU) utilization, because the added number of transactions is a multiple of the number of items and nodes. This still only returned the availability of the 100 closest stores, so it did not consider drawing down excess non-essential inventory from remote nodes. In ATP-only models, response times for Ship Methods (SM) to ATP calls were estimated at greater than 1-2 seconds if all 1800 possible nodes of the example were included. At 500,000 orders per hour, 28,500 (transactions per second) TPS of multiline calls from a Checkout system to SM are required. In the example, utilization of the INI system showed that at 42,000 TPS of INI calls, a response time of 43 milliseconds (with p99 latency) was achieved.

Additionally, in examples of ATP-only systems, about 15% of multi-item orders may be consolidated, saving approximately $1 on each order for shipment. In examples, an adjustment to cover up to 100 nodes utilizing the INI application may change consolidation opportunity to up to 26%, which results in a weekly increase in consolidation that saves 26k packages per week, or up to $10M in shipping expenses annually. Particularly for online carts/online orders designated as not requiring shipment on a rush basis (a "No Rush" cart), the estimated delivery date increase is only about 0.04 days, and a slight increase of early deliveries of about 1% can be expected due to consolidation.

These and other examples will be explained in more detail below with respect to FIG. 1-FIG. 12.

FIG. 1 illustrates an example distribution system 100 for possible deliveries of an item from one or more nodes to a destination 102. As will be described in more detail below, the distribution system 100 may additionally include carriers 112, 114, 116, 118 and node groupings 104, 106, 108, 110.

A customer/user may order one or more items/products from an enterprise that are to be shipped to a destination 102. Destination 102 may be a home, business, store, post office box, or other destination. The items will ultimately be sourced from one or more nodes (e.g. warehouses, fulfillment centers, consolidation centers, stores, producers, factories, or other node types) of the enterprise, packaged, and shipped via one or more couriers 112, 114, 116, 118 (e.g. trucks, vans, other road vehicles, air freight, barges, freighters, cargo vessels, or other shipping methods).

The shipping nodes may be located across a geographic area, and the example depicts node groupings 104, 106, 108, 110. In the depicted example (which is not to scale), node grouping 104 represents the nodes closest in geographical distance to the destination 102 (for example, the closest 40 nodes); node grouping 106 represents the next closest nodes by geographical distance from the destination 102 (for example, nodes 41 to 200); node grouping 108 represents the next closest nodes by geographical distance from the destination 102 (for example, nodes 201-300); and node grouping 110 represents the next closest nodes by geographical distance from the destination 102 (for example, nodes 301-400). Although these numbers of nodes are used herein for the purpose of describing particular examples, other numbers of nodes may be contemplated.

Once a particular node from a grouping of nodes is selected that has one or more items in stock/available for shipping (for example, a node from node grouping 104), the items will be packaged and shipped (for example, via carrier 112) to destination 102. In some examples, one or more items will pass through additional warehouses, sortation centers, consolidation centers, or distribution centers during the shipping process.

In some examples, if ordered items destined for shipment to the same destination 102 can be consolidated (supplied from the same node), they may be able to be packaged together, thus reducing packaging cost and handling cost. In some examples, if ordered items destined for shipment to the same destination 102 can be consolidated (supplied from the same node), they may be able to be shipped via the same courier and delivered at the same time on the same courier delivery route, thus reducing shipping cost (mileage, fuel, and other associated transportation costs).

Figure 2:
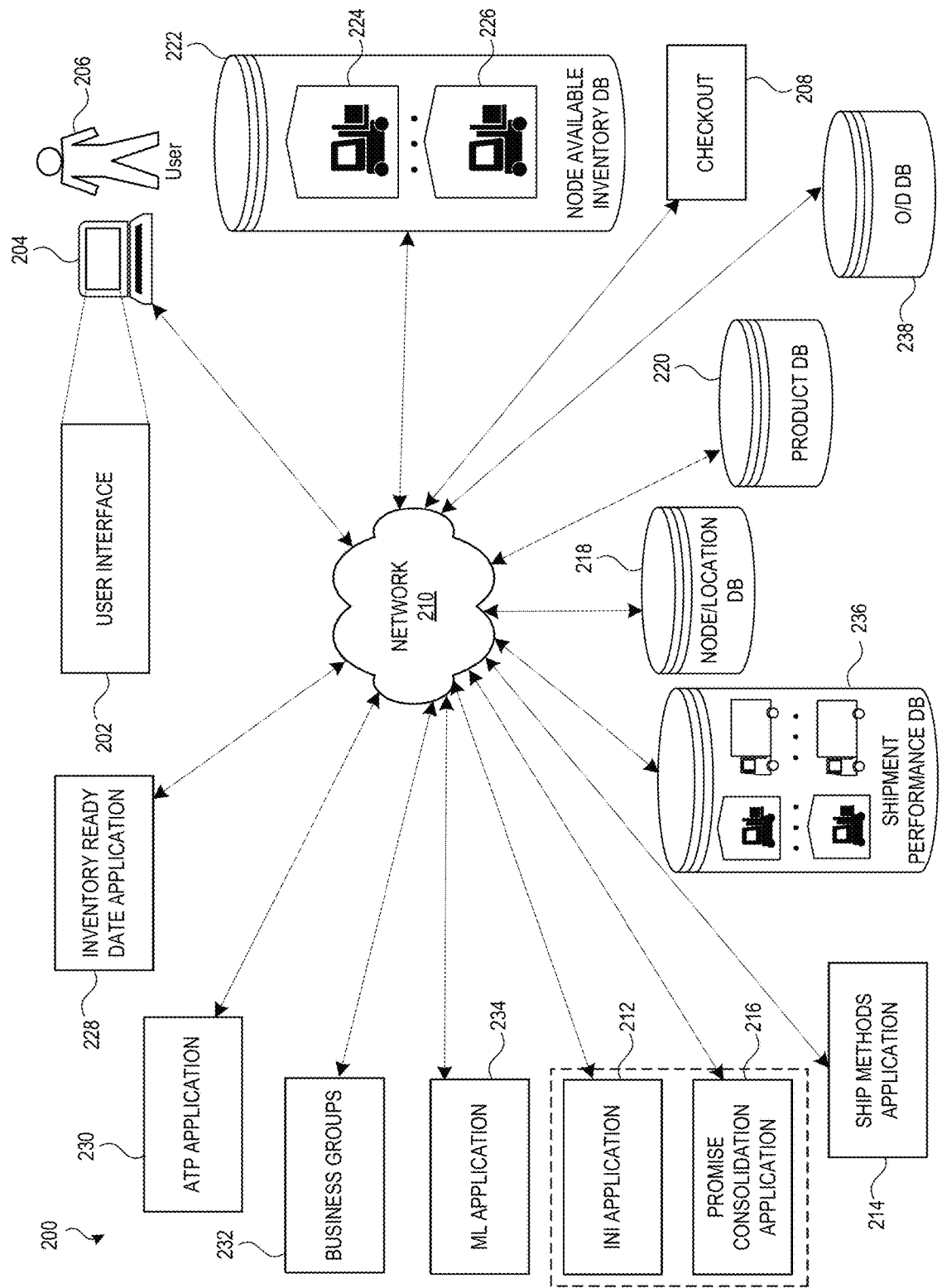
FIG. 2 illustrates an example system for performing intelligent node consolidation, according to an example.

FIG. 2 illustrates an example system 200 for performing intelligent node consolidation. As will be described in more detail below, the system 200 may include a user interface 202, user device 204, user 206, checkout system 208, network 210, intelligent node inclusion (INI) application 212, ship methods (SM) application 214, promise consolidation application 216, node/location database 218, product (item) database 220, node available inventory database 222 (which may include inventory data from a plurality of nodes 224, 226), inventory ready date application 228, available to promise (ATP) application 230, business groups 232, machine learning (ML) application 234, shipment performance database 236, and origin/destination (O/D) pair database 238.

In some examples, the devices, applications, and systems of system 200 are configured to send and receive data via network 210. In some examples, as described herein, network 210 may include a computer network, an enterprise intranet, the Internet, a LAN, a Wide Area Network (WAN), wireless transmission mediums, wired transmission mediums, other networks, and combinations thereof. Although network 210 is shown as a single network in FIG. 2, this is shown as an example and the various communications described herein may occur over the same network or a number of different networks.

In some examples, user interface 202 may include an enterprise virtual shopping cart that contains one or more items (products) selected by user 206 (for example, a customer or potential customer of the enterprise) via device 204. In an example, user interface 202 is a web application. In other examples, user interface 202 is a device application. User interface 202 may be presented to the user 206 via a display of device 204. In some examples, device 204 may be a desktop computer, a laptop computer, a tablet, a cell phone, a smart TV, a smart wearable device, or other appropriate electronic device which is capable of displaying and facilitating interaction with the user interface 202.

Information (for example, information relating to an online shopping cart including two or more items) from the user interface 202 may be received by SM application 214, which may provide a call to ATP application 230. ATP application 230 may be configured to determine a number of nodes that have two or more items of a virtual shopping cart in stock/available to ship that are within a predetermined distance from a delivery destination. In making this determination, ATP application 230 may receive information from the user interface 202 (e.g. the two or more items), from the node/location database 218, the product database 220, the node available inventory database 222, the inventory ready date application 228, the O/D pair database 238, and/or other information sources.

The product database 220 may include product/item information, including item ID information, size, features, categories, pricing, vendor/supplier, storage and/or shipping considerations, and/or other information related to items sold/provided by the enterprise. The node/location database 218 may include information related to the various nodes of the enterprise and their locations, including addresses, coordinates, direction/street information, layout, features, hours, time zone, pickup/delivery information/requirements, loading dock information, and other data. The O/D pair database 238 may include information relating to a delivery route between various origins and destinations. In some examples, this information may include data based at least in part off of information from the node/location database 218. Origins and destinations may include nodes, sortation centers, user-selected item destinations, and/or others. The information for each O/D pair may include distance between each member of the pair (via different types of transport/shipping means), travel time, or other special considerations (for example, weight or height limits on certain roads). Node available inventory database 222 may include information related to inventory levels of items at various enterprise nodes (e.g. for Node 1 224 to Node n 226). The inventory information may include whether a particular item is in stock, when the item will be ready for shipment, a quantity of the items in stock, and other information. In some examples, some of this information may be utilized by or provided by inventory ready date application 228. Inventory ready date application 228 may be configured to determine when an item will be ready for shipment from a node. For example, if a particular item is in stock at Node 224, but it will take a first amount of time to be retrieved from its storage location and a second amount of time to package for shipment, then inventory ready date application 228 will calculate the date and/or time the item will actually be ready for pickup/shipment by a courier.

Databases described herein may be of any appropriate database type, including distributed, centralized, relational/SQL, object-oriented, column-oriented, NoSQL, cloudbased, on-premises, operational, analytical, flat-file, network, graphical, time series, multi-model, and/or other database types. Although the databases described/shown herein are described as standalone databases for the purpose of illustrating the particular examples described, in some examples, the databases may be wholly or partially combined with other databases (including databases described relating to these examples and other enterprise databases).

Information (for example, information relating to an online shopping cart including two or more items) from the user interface 202 may be received by INI application 212, which may be configured to determine a predetermined number of nodes that have the two or more items in stock, regardless of the distance between the node and the destination. INI application 212 may receive data from ATP application 230, node/location database 218, product database 220, user interface 202, node inventory database 222, inventory ready date application 228, and/or other information sources.

In some examples, promise consolidation application 216 may receive the identified nodes from both the ATP application 230 and INI application 212 and apply business rules and/or market levers to the identified nodes to determine whether to ship the two or more items from a single node, which node from which to ship the two or more items, and whether or not to provide/promise a shipment option to user 206 via user interface 202 (e.g., 2-day shipping, next day shipping, consolidated shipping, a discount on shipping, or others). The business rules may be received, at least in part, from business groups 232 (e.g. marketing, finance, logistics, different geographical regions, etc.). For example, a business group may desire to minimize cost of packaging and/or delivery. Another business group may desire to maintain a particular amount of inventory of particular "essential" items at particular nodes. Another business group may desire to promote sale of a particular product based on category and seasonality. Another business group may wish to take into account local, regional, national, or international market performance. These desires may be translated into business rules and/or market levers processed and balanced by the promise consolidation application 216. In some examples, promise consolidation application 216 and INI application 212 may be separate applications. In some examples, promise consolidation application 216 and INI application 212 may be within the same application or within the same framework. In some examples, SM application 214 and/or INI application 212 is also involved in the determination of whether to ship the two or more items from a single node, which node from which to ship the two or more items, and whether or not to provide/promise a shipment option to user 206 via user interface 202; and/or in the application of business rules.

In some examples, user 206 may select a purchase/checkout option on user interface 202. This may implicate a checkout system 208, which may facilitate payment for the items (including taking into account any discounts, taxes, shipping charges, or promotions). This may include prompting the user 206, via user interface 202, to enter/select shipping information, select shipping options, select packaging options, select warranties, enter payment information (such as credit/gift/debit card/bank/check) information, link to external payment systems, enter promotional information (e.g. coupon/discount codes), select gift/receipt information, or to perform other actions related to shipping/purchase of the items. In some examples, after payment is received and processed by checkout system 208, an instruction is sent to initiate shipment of the items form the final selected node.

In some examples, a user 206 selects a checkout option prior to the ATP application 212 and/or INI application selecting any nodes. In some examples, the ATP application 212 and/or INI application may make node selections prior to the user 206 selecting a checkout option.

After the items are shipped, data relating to the shipment may be stored in a shipment performance database 236. Shipment performance database 236 may include information related to courier reliability and punctuality (for example, if a data trend shows that a particular courier is consistently taking longer than anticipated to make deliveries), node reliability and punctuality (for example, if a data trend shows that a particular node consistently is taking longer than predicted to package a certain category of item), route reliability or disturbances (for example, if couriers routinely experience delays on a particular route), durations, costs, or other information.

In some examples, ML application 234 may receive information from shipment performance database 236, user interface 202, node available inventory database 222, business groups 232, product database 220, and/or other information sources. ML application 234 may evaluate and update the information of at least node/location database 218, product database 220, and/or O/D database 238. This updated information may then be utilized by the ATP application 230 and/or INI application 212 (and other applications) to increase the accuracy/efficiency/relevancy of their node selections.

Figure 3:
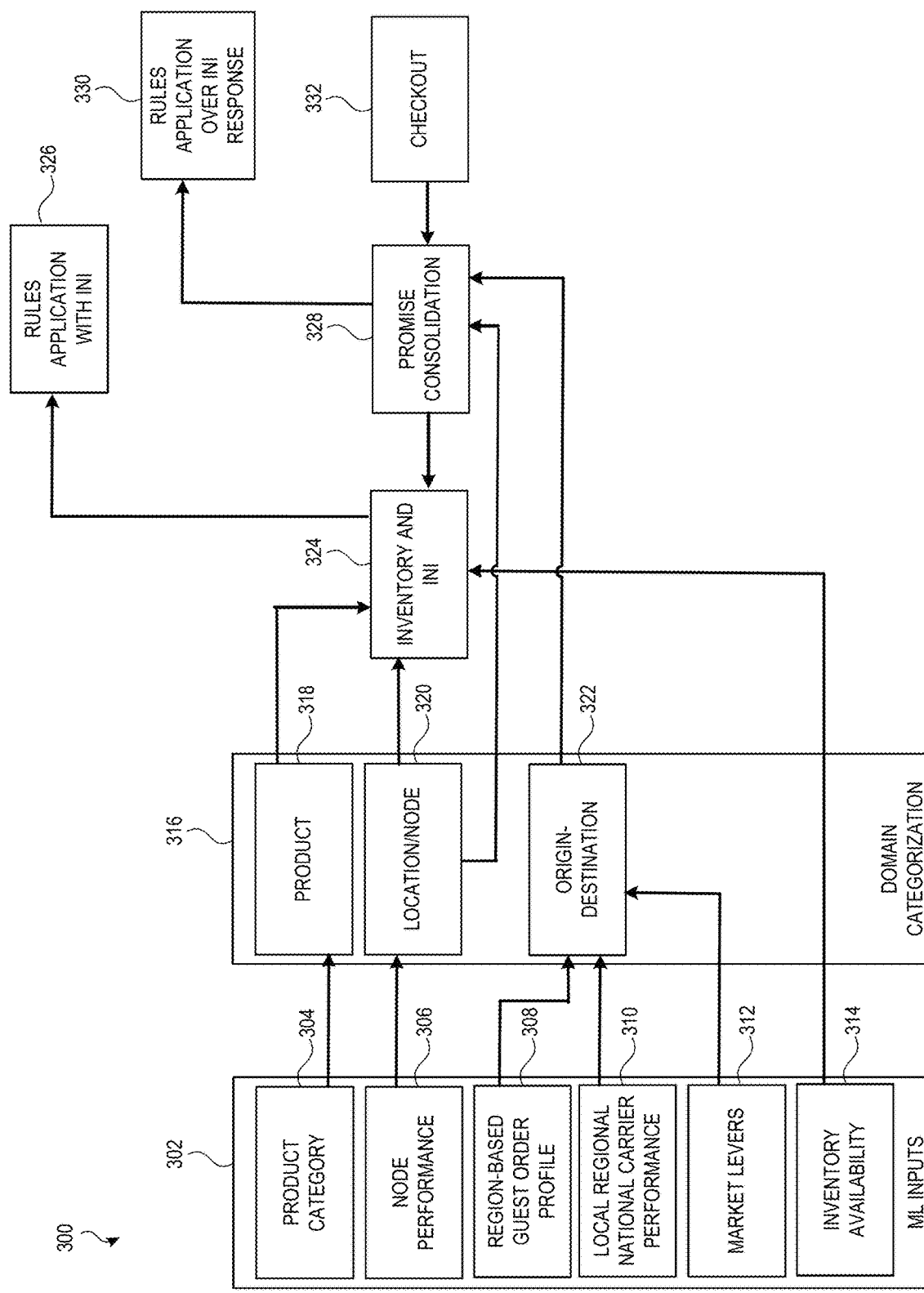
FIG. 3 illustrates an example machine learning process, as part of the system of FIG. 2.

FIG. 3 illustrates an example machine learning process 300 (for example, including ML application 234), as part of the system 200. In an example, the ML application (an artificial intelligence (AI) application) receives one or more ML inputs 302. The inputs may include a product category 304 (for example, a category of an item that was or may be shipped), node performance 306, region-based guest order profile information 308 (for example, address information or purchasing information associated with a user 206), local regional national carrier performance 310, market levers 312, and/or inventory availability 314. In some examples, the ML application is a supervised learning application. In other examples, the ML application is an unsupervised learning application. In some examples, the ML application ingests the ML inputs 302 and creates new/updates existing domain characterization data 316 such as product data 318 (including product attributes), location/node data 320 (including location attributes), O/D pair data 322 (including user/guest zip code to source node pair attributes), inventory data, and/or other data. Product data 318 may include essential status vs. nonessential status (for example, an item/product may be assigned an essential status if the enterprise determines that a certain number of the item must remain in stock at a particular node in a particular location); a forced slower shipping option (for example, requiring special transportation that was limited to a certain slower route or slower courier vehicle); and/or product-market associations (for example, carrying winter clothing in markets associated with colder climates, and the like). Location/node data 320 may include on node capacity, node performance, and/or proximity/distance to the item destination. O/D pair data 322 may include LRN data, transit/carrier/lane data, and/or distance clusters or market data. In some examples, the domain characterization data 316 is added to existing data in databases. In some examples, the domain characterization data 316 is utilized to update or replace existing data in databases. The added and/or updated domain characterization data 316 may be utilized by downstream systems.

Inventory systems and INI application 324 may receive updated/new product data 318, location/node data 320, and/or inventory availability data. Inventory systems and INI application 324 may also receive information from a promise consolidation application 328 (for example, promise consolidation application 216). The INI application (for example, INI application 212) may determine a number of nodes that have two or more items in stock. During or subsequent to that determination, (business) rules and filters may be applied 326 within the INI application. Application of these rules may be based on a request from a promise consolidation application, a request from an enterprise fulfillment application, or from another enterprise entity. This may include application of product level levers (e.g., an inventory level of a specific item is above, below, or within a particular threshold); application of location level levers (e.g., a distance between a node and a destination is above, below, or within a particular threshold); and/or application of item/product-location levers (e.g., a particular node is required to maintain a particular number of items in stock). Other rules may be applied. In some examples, if the application of the rules results in a tie decision between two or more nodes, a tie-break rule may be applied, or a particular rule may be prioritized over others. For example, the product-location lever may take priority over a location level lever, which may take priority over a product level lever.

Promise consolidation application 328 may receive updated/new location/node data 320, O/D pair data 32, and/or data from a checkout system 332 (for example checkout system 208). Promise consolidation application 328 may apply various (business) rules 330 over an INI application response. For example, these rules may be applied to the nodes that were determined by the INI application and/or an ATP application (for example, ATP application 230). Application of these rules may be based on a request from a guest (for example, guest user 206) that was received via a user interface (for example, user interface 202). This may include application of various priority and/or filter rules. For example, a priority rule may mean that one selection (e.g., one node, O/D pair, carrier, cluster, etc.) is preferred over another; and a filter rule may mean that the possible selections are filtered such that those with only a particular feature or that meet a particular requirement are available for selection (for example, only ground carriers, or only O/D pairs that do not require a median sortation center, etc.). Application of the rules may include application of an INI priority/filter; application of an O/D pair priority/filter; application of a carrier priority/filter; application of a cluster priority/filter (in an example, nodes may be clustered based on features such as location/distance); and/or application of a local/regional/national (LRN) priority/filter. Other rules may be applied. In some examples, if the application of the rules results in a tie decision between two or more nodes, a tie-break rule may be applied, or a particular rule may be prioritized over others. For example, a single-node consolidation may take priority over a cluster propriety/filter, which may take priority over an LRN priority, which may take priority over O/D pair priority, which may take priority over a defined default logic.

In some examples, the machine learning process 300 and ML application receive ML inputs 302 and updates the domain characterization data 316 (and therefore updates the inputs to the inventory systems and INI application 324 and promise consolidation application 328) on a continuous, real-time basis. In some examples, the machine learning process 300 and ML application receive ML inputs 302 and updates the domain characterization data 316 (and therefore updates the inputs to the inventory systems and INI application 324 and promise consolidation application 328) on a periodic basis (for example, a predetermined number of minutes between updates, hourly, daily, weekly, monthly, or other time period). The improvement and updated input data lead to improved node selections from the INI application and promise consolidation application.

Figure 4:
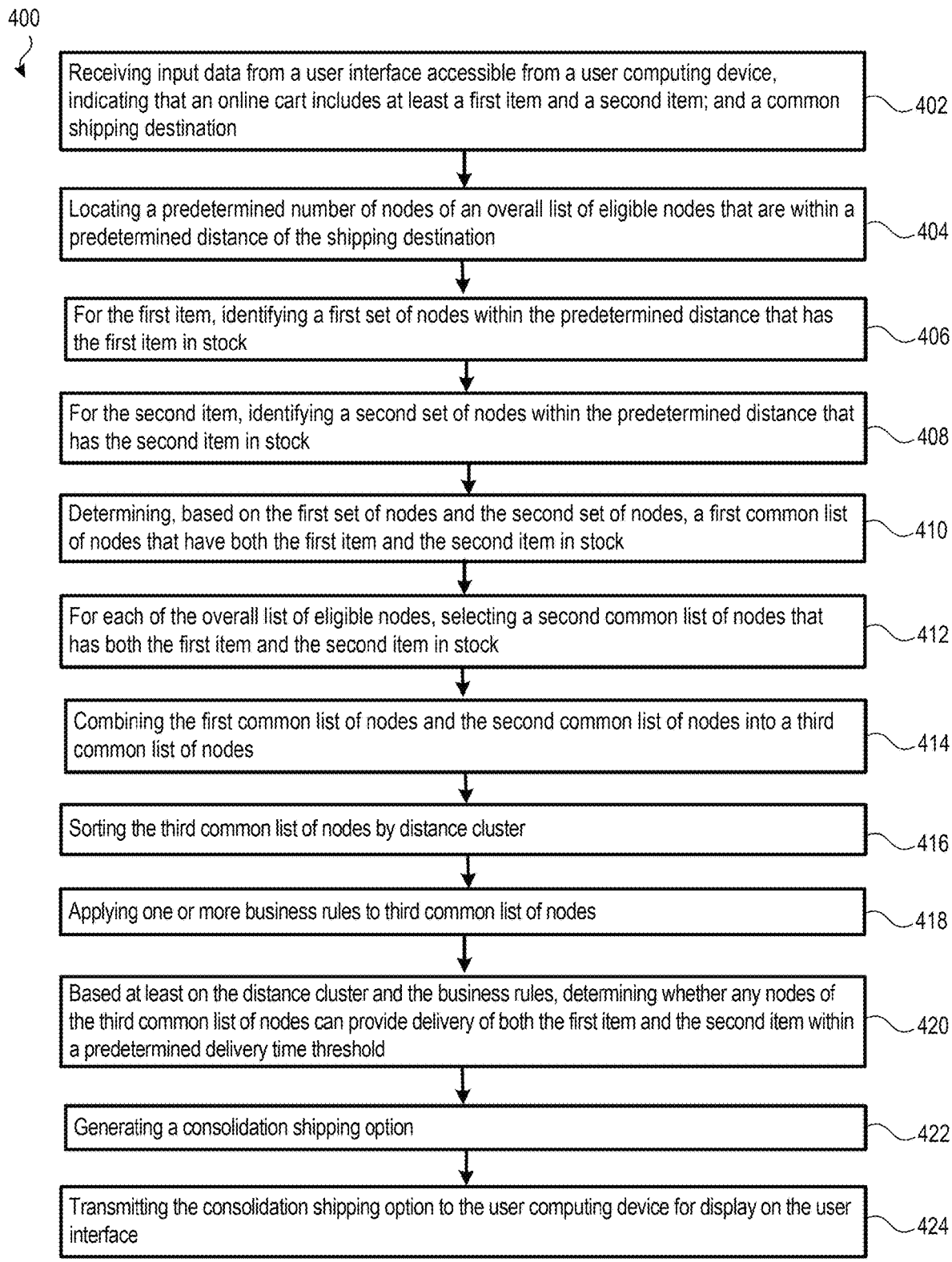
FIG. 4 illustrates an example method for performing intelligent node consolidation, according to an example.

FIG. 4 illustrates an example method 400 for performing intelligent node consolidation. At operation 402, input data is received from a user interface accessible from a user computing device (for example, from a user interface 202 on user device 204). The input data may indicate that an online cart displayed on the user interface includes at least a first item and a second item (for example, that the user has selected for potential purchase) and there is a common shipping destination (for example, a home or business as indicated by the user) for the plurality of items. In some examples, the input data further indicates that a user has selected a checkout option (to begin the process of purchasing the items) of the online cart. In some examples, the input data may be received at an SM application, such as SM application 214. In some examples, the online cart includes more than two items.

At operation 404, a predetermined number of nodes of a total number of nodes are located that are within a predetermined distance of the shipping destination. In a particular example, an ATP application (for example, ATP application 230) may select a number of nodes (for example, nodes as described above with respect to FIGS. 1 and 2) that are the closest to a home address provided by the user. The ATP application may have been called by a SM application. In a particular example, an ATP application may select a number nodes based on their proximity to a zip code of the user. In some examples, the ATP application is operated at a first computer system.

At operation 406, for the first item, a first number of nodes is identified within the predetermined distance that has the first item in stock, based on a node available inventory at each node. At operation 408, for the second item, a second number of nodes is identified within the predetermined distance that has the second item in stock, based on the node available inventory at each node. In examples where the online cart includes more than two items, operation 406/408 may be repeated for each item of the online cart.

At operation 410, based on the first number of nodes and the second number of nodes, a first common list of nodes is determined that have both the first item and the second item in stock. For example, the first common list of nodes may include a predetermined number of nodes (in a particular example, 40 nodes) that have both the first item and the second item in stock.

At operation 412, for each of the total number of nodes, a second common list of nodes is selected that has both the first item and the second item in stock, based on the node available inventory at each node, wherein the second common list of nodes includes a second predetermined number of nodes. In a particular example, an INI application (for example, INI application 212) selects 10 nodes for the second common list of nodes, each of which have both the first and second items in stock. The 10 nodes of the second common list of nodes may be selected, regardless of their proximity/distance to the destination. In some examples, the INI application is operated at a second computer system that is communicatively connected to a first computer system.

In some examples, the INI application utilizes data that is updated real-time/continuously and/or periodically by an ML application (for example, ML application 234).

At operation 414, the first common list of nodes and the second common list of nodes are combined into a third common list of nodes. In the particular example, the 40 nodes of the first list and the 10 nodes of the second list are both combined for further evaluation.

At operation 416, the third common list of nodes is sorted by distance cluster. In some examples, this sorting may be done at an INI application or a promise consolidation application (for examples promise consolidation application 216). In some examples, the promise consolidation application may be is operated at the second computer system that is communicatively connected to the first computer system. In some examples, the promise consolidation application may be operated at the first computer system that is communicatively connected to the second computer system. In some examples, the promise consolidation application may be operated at another computer system communicatively connected to the first and/or second computer systems. In some examples, the business rules utilize data that is updated real-time/continuously and/or periodically by an ML application (for example, ML application 234).

At operation 418, one or more business rules are applied to the third common list of nodes. In a particular example, the one or more business rules may have been received based off of information received from one or more business groups of the enterprise, as described herein. In a particular example, the one or more business rules may be applied at a promise consolidation application.

At operation 420, based at least on the distance cluster and the business rules, it is determined whether any nodes of the third common list of nodes can provide delivery of both the first item and the second item within a predetermined delivery time threshold. For example, it may be determined whether a particular node can provide for delivery of both the first and second items (by a courier such as courier 112, 114, 116, or 118) in two days or fewer, so that a 2-Day shipping option may be provided to the customer via the user interface.

In some examples, applying the one or more business rules includes evaluating a cost of providing both the first and second items for shipping from a particular node. If a particular node can provide the items at a lower overall cost, but with a calculated shipping/delivery time that is later than may be provided from other nodes, the node with the lowest cost may be selected, and an option for consolidated shipping utilizing this node may be provided to the user via the user interface. In such an instance, a discount may be provided to the user to incentivize them to choose this lowest-cost consolidated shipping option even though it may mean that the user waits longer for delivery of the first and second items.

In some examples, applying the one or more business rules includes receiving the one or more business rules from at least one business group (for example, business groups 232) and applying one or more filters. The one or more filters may be included in the one or more business rules, and each of the one or more filters may be assigned a priority. In some examples, applying filters may include filters as described above with respect to FIG. 3 and below with respect to FIG. 5.

In a particular example, applying the one or more business rules may include receiving an item non-essential label for both the first item and the second item. A local subset of nodes of the third common list of nodes may be determined to have at least one of a first item capacity and a second item capacity below a capacity limit threshold. A non-local subset of nodes of the third common list of nodes may be determined to have both the first item capacity and the second item capacity above a capacity limit threshold. The consolidation node may be selected from among the non-local subset of nodes.

In another particular example, applying the one or more business rules may include determining that a local subset of nodes of the third common list of nodes has at least one of a first item capacity and a second item capacity below a capacity limit threshold. It may be determined that a first non-local subset of nodes of the third common list of nodes has at least one of a first item capacity and a second item capacity below a capacity limit threshold and may be determined that a second non-local subset of nodes of the third common list of nodes has both the first item capacity and the second item capacity above a capacity limit threshold. The consolidation node may be selected from among the second non-local subset of nodes.

In another particular example, applying the one or more business rules may include determining that a local subset of nodes of the third common list of nodes includes a first sortation center and determining that a first non-local subset of nodes of the third common list of nodes includes a second sortation center. For example, the individual nodes of the subsets of nodes (warehouses, stores, etc.) may each not have all items of the online shopping cart, but the individual nodes may be serviced by a single sortation center. That sortation center may receive the items and serve as a node from which to provided consolidated shipping of all of the items of the online cart. It may also be determined that a second non-local subset of nodes of the third common list of nodes includes a single non-sortation center node (for example, a warehouse or store). In some examples, the single non-sortation center node may be selected to be the consolidation node, even though it may be a greater distance away from the destination than the nodes of the local subset of nodes or first non-local subset of nodes.

At operation 422, upon determination that at least one node of the third common list of nodes can provide delivery of both the first item and the second item within the predetermined delivery time threshold, a consolidation shipping option is generated. In a particular example, the consolidation shipping option may include that both the first item and the second item may be shipped from a particular node and may arrive to the destination within 7 to 10 days; that this a longer timeframe than another possible shipping option where the first item and second item are shipped from separate nodes (for example, 2 days); and that a discount may be provided to the user (for example, the customer) to incentivize them to select the consolidation shipping option.

In some examples, the discount may be calculated to be less than an overall cost savings (to the enterprise) of consolidating the item. In some examples, if an adequate discount (i.e. one that is determined to be large enough to incentivize a user) is greater than a determined cost savings of consolidation, the consolidation shipping option may not be generated, or a different consolidated shipping option/node may be selected. In some examples, the discount is calculated to be a static cost value that is provided to the user. In other examples, the discount is a variable value that is calculated based at least off of the determined cost savings of consolidation. For example, if a particular consolidated shipping option is generated that results in a larger determined cost savings (for example, a determined cost savings greater than a predetermined threshold), a larger discount may be calculated and provided to the user. If a particular consolidated shipping option is generated that results in a smaller determined cost savings (for example, a determined cost savings less than a predetermined threshold), a smaller discount may be calculated and provided to the user.

At operation 424, the consolidation shipping option is transmitted to the user computing device for display on the user interface. For example, the user interface may display a consolidation shipping option to the user that provides a shipping estimate (for example, a certain number of days or a range of days). In some examples, a consolidation discount may be generated for display on the user interface. The discount may be applied to the cost of the user's order.

A user input may be received from the user computing device that the user has selected the consolidation shipping option. A consolidation node of the at least one node of the third common list of nodes may then be selected, and instructions may be sent to the node and to couriers to begin the shipment process (for example, to gather and package the item, and to schedule pickup, transit, and delivery of the item). Upon receiving the instruction from the user interface to ship both the first item and the second item according to the consolidation shipping option, shipment performance information relating to the first item and the second item may be tracked. The shipment performance information may be stored in a shipment performance information database.

In some examples, machine learning input information is received at a machine learning application. In some examples, the machine learning application is a supervised learning application. In some examples, the machine learning application is an unsupervised learning application.

Stored data values may be updated by the machine learning application, where selection of the second common list of nodes depends at least partially on the updated stored data values. Determining that at least one node of the third common list of nodes can provide delivery of both the first item and the second item within the predetermined delivery time threshold may depend at least partially on the updated stored data values. The one or more business rules may be based at least partially on the updated stored data values.

In some examples, the updated stored data values include product information, node location information, and origin-destination pair information. In some examples, the machine learning input information includes node performance, carrier performance, user profile information, inventory availability, market levers, and/or item information. In some examples, the stored data value includes node information, node location information, item data, inventory data, and/or origin-destination pair information.

In some examples, updating the stored data values may occur on a real-time basis. For example, data/information may be received from nodes, couriers, enterprise groups, and/or other sources as it is gathered. This data may be received by the machine learning application as the machine learning input data is received. In some examples, updating the stored data values may occur on a periodic basis. For example, data/information may be received from nodes, couriers, enterprise groups, and/or other sources as it is gathered. The machine learning application may receive that data on a periodic basis (for example, a certain number of hours, days, weeks, months, etc.) and update the stored data values.

In some examples, where the online cart includes more than two items, the steps described above may include determining a consolidation shipping option wherein some or all of the items included in the online cart are shipped from a single selected node.

Figure 5:
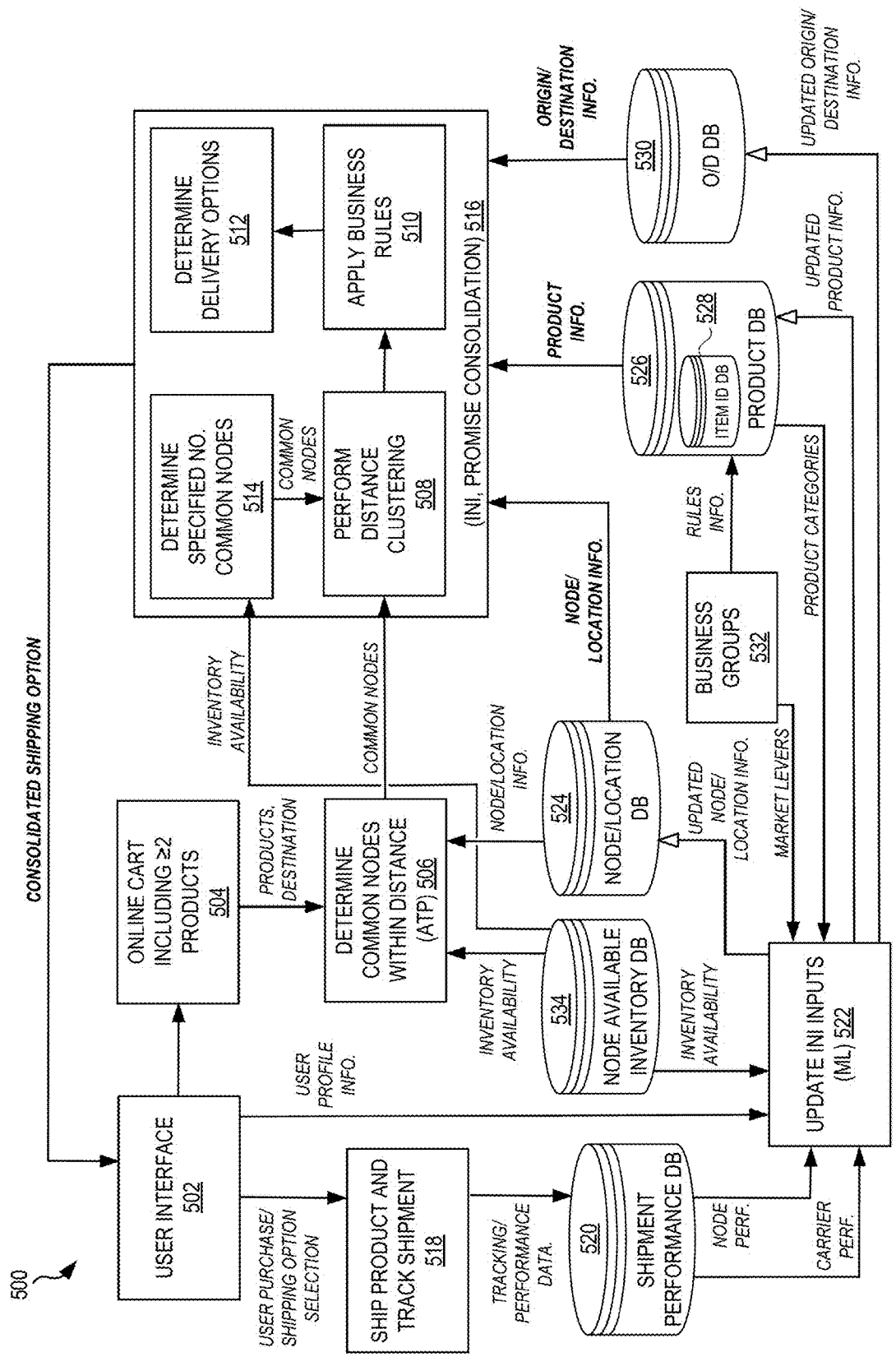
FIG. 5 illustrates an example information flow diagram among components of a system for performing intelligent node consolidation, according to an example.

FIG. 5 illustrates an example information flow diagram 500 among components of a system (for example, system 200) for performing intelligent node consolidation. At operation 502, a user interface (for example, user interface 202) may receive information from an online user. The information may include user profile information (for example, address/zip code/location, purchase history, search history, shipping selection history, or other information). The information may also include indication to add two or more items to an online shopping cart.

At operation 504, an online shopping cart that includes two or more items (for example, products to be purchased) may be displayed on the user interface. Information about the two or more items/products in the online shopping cart and at operation 506, information relating to a common delivery destination for the two or more items may be utilized, at least in part, to determine common nodes (for example, of nodes 104) that have the two or more items in stock and that are within a predetermined distance of the delivery destination. This determination of the common nodes (for example, 40 common nodes) within a predetermined distance at operation 506 may also include inventory availability (e.g. which nodes have which of the items in stock) information stored from a node available inventory database 534 (for example, node available inventory database 222). The determination of the common nodes within a predetermined distance at operation 506 may also include node and/or location information (for example, addresses/zip codes of the destination, the nodes, and courier routes between the two) received from a node/location database 524 (for example, node location database 218). In some examples, operation 506 may be carried out by an ATP application such as ATP application 230, which may have been called by an application such as ship methods (SM) application 214.

At operation 532, business rules and/or market levers may be generated by one or more business groups of the enterprise (for example, business groups 232).

An intelligent order consolidation process/operations 516 may include one or more sub-operations (for example, operations 514, 508, 510, and 512 as described below). Intelligent order consolidation process/operations 516 may be performed, in some examples, at INI application 212, promise consolidation application 216, and/or ship methods application 214. Node and/or location information (for example, from node/location database 524), product information (including product categories, attributes, costs, essential status, seasonality, priority, inventory availability (for example, as stored in node available inventory database 524), item ID (for example, item ID data stored within product database 526 or in a separate item ID database 528), business rules or priorities, or other product information from product database 526), origin/destination information (for example, courier routes, locations, shipping restrictions, seasonal affects, etc. from origin/destination database 530), and/or common nodes as determined at operation 506 may be received at order consolidation operations 516.

At operation 514, based at least on inventory availability at various nodes, a specified number of nodes (for example, 10) common nodes having the two or more items in stock and available to ship may be determined, which may be outside of the predetermined distance of the destination. These common nodes as well as the common nodes determined at operation 506 may be analyzed further, for example, by performing distance clustering at operation 508. These nodes may be then further analyzed by application of various business rules and/or filters at operation 510. Based on these analyses and, in some examples, on cost information associated with the consolidation, packaging, and shipping, a final consolidated shipping option is determined at operation 512. This consolidated shipping option (e.g. shipping the two or more items from a selected node via a selected courier on a particular route) may be displayed to a user via the user interface at operation 502.

If a user selects the consolidated shipping option at the user interface for delivery of the purchased two or more items of the online cart, instructions may be sent/received to initiate packaging and shipment of the products/items from the selected node via the selected courier. At operation 518, as the items are prepared/packaged for shipment, shipped, and delivered, data may be gathered and the shipment tracked. For example, time spent on preparation, time in transit, delays, lost packages, performance (for example, frequency of on-time or late delivery), damaged packages, and other data may be tracked for products/categories of products, locations, nodes, couriers, routes, etc. This tracked/performance data bay be stored in a shipment performance database 520 as it is received.

A machine learning application (for example, ML application 234) may receive node performance and/or carrier performance data (or other tracked data from shipment performance database 520), user profile information, available item inventory, product categories and/or other product information (for example, from product database 526), and/or market levers (for example, relating to item essential status, seasonal priorities, etc. as dictated by various business groups at step 532). At operation 522, the machine learning application may update data that is utilized at the intelligent order consolidation operations 516 (including node/location information, product information, and origin/destination information, for example). The use of the updated information by the intelligent order consolidation operations 516 increases the accuracy and/or efficiency of the ultimate selection of the consolidated shipping option. Updated information may be stored in the appropriate database (for example, node/location database 524, product database 526, and/or O/D database 530) in addition to the previous data or in place of the previous data.

Figure 6:
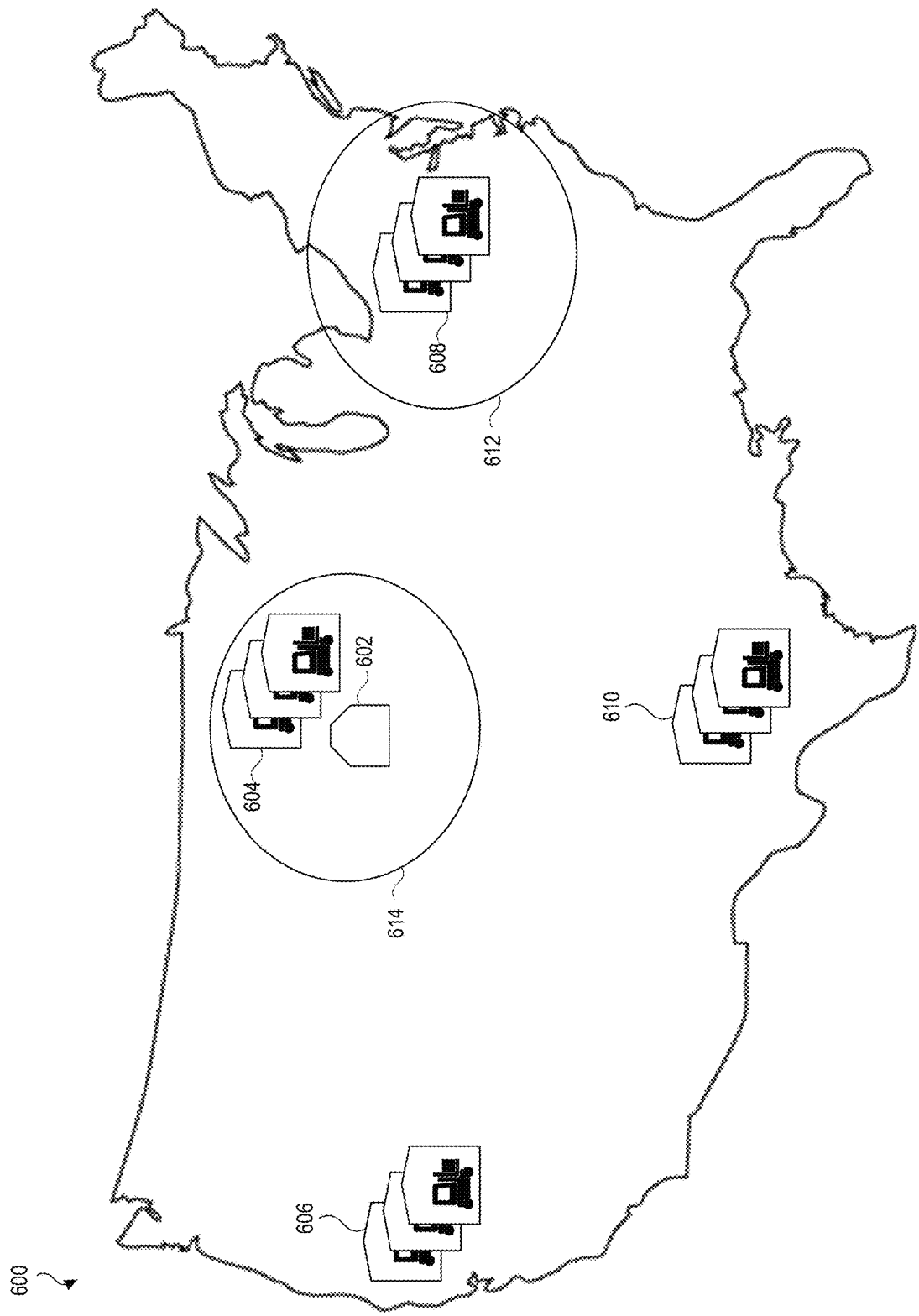
FIG. 6 illustrates an example scenario for consolidation of one or more items to be delivered to a destination, within the example distribution system of FIG. 1.

FIG. 6 illustrates an example scenario 600 for consolidation of one or more items to be delivered to a destination 602. The particular example illustrated in scenario 600 considers shipping nodes located across a geographic area, particularly node groupings 604, 606, 608, 610. In the depicted example (which is not to scale), node grouping 604 represents the nodes closest in geographical distance to the destination 602 (for example, the closest 40 nodes); node grouping 606 represents the next closest nodes by geographical distance from the destination 602 (for example, nodes 41 to 200); node grouping 608 represents the next closest nodes by geographical distance from the destination 602 (for example, nodes 201 to 300); and node grouping 610 represents the next closest nodes by geographical distance from the destination 602 (for example, nodes 301 to 400). Although these numbers of nodes and node grouping locations are described in this particular example, other numbers and locations of nodes may be contemplated.

In scenario 600, a user has selected four items/products to be shipped to destination 602. Item 1 is in stock at all of nodes 1 to 400. Item 2 is in stock at nodes 50 to 300. Item 3 is in stock at nodes 125 to 350. Item 4 is in stock at nodes 250 to 400. All four items are therefore available at common nodes 250 to 300 (see area 612).

In scenario 600, if available computing power/capability limits the number of evaluated nodes to less than 250 (for example, 40 in this particular example), and only the closest 40 nodes are evaluated, no nodes will be identified for consolidation that can provide all four items for consolidated shipping.

However, if a ship methods application calls an ATP application to determine the 40 closest nodes that have all four items available within a predetermined distance (see area 614) of the destination as described herein, and an INI application provides 10 nodes that have all four items available as described herein, even if the ATP application finds no nodes that have all four items in stock within the predetermined distance, the INI application may still return up to 10 possible nodes for consolidated shipping.

A promise consolidation application may then evaluate the up to 10 possible nodes to determine if any should be selected as a final consolidated shipping option to a user/purchaser of the items, and if a discount should be provided along with a selected option. In some examples where a provided discount is not a predetermined static value, the value of the discount may also be determined.

Figure 7A:
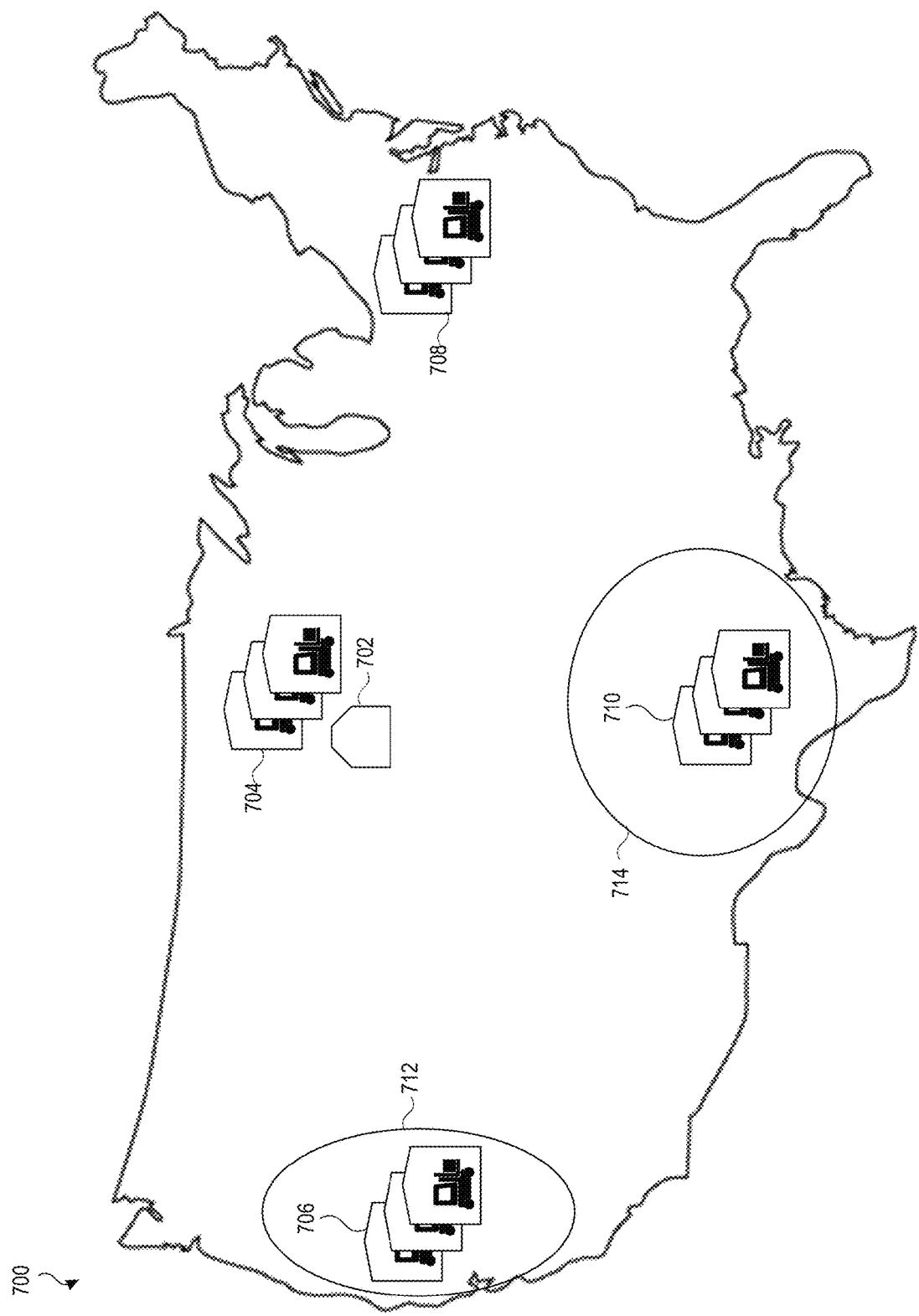
FIG. 7A illustrates an example scenario for consolidation of one or more items to be delivered to a destination, within the example distribution system of FIG. 1.

FIG. 7A illustrates an example scenario 700 for consolidation of one or more items to be delivered to a destination 702. The particular example illustrated in scenario 700 considers shipping nodes located across a geographic area, particularly node groupings 704, 706, 708, 710. In the depicted example (which is not to scale), node grouping 704 represents the nodes closest in geographical distance to the destination 702 (for example, the closest 40 nodes); node grouping 706 represents the next closest nodes by geographical distance from the destination 702 (for example, nodes 41 to 200); node grouping 708 represents the next closest nodes by geographical distance from the destination 702 (for example, nodes 201 to 300); and node grouping 710 represents the next closest nodes by geographical distance from the destination 702 (for example, nodes 301 to 400). Although these numbers of nodes and node grouping locations are described in this particular example, other numbers and locations of nodes may be contemplated.

In scenario 700, a user has selected four items/products to be shipped to destination 702. All 4 items are available at all nodes 1 to 400.

In scenario 700, if available computing power/capability limits the number of evaluated nodes (for example, 40 in this particular example), and only the closest 40 nodes are evaluated, because all four items are available at all nodes, 40 possible consolidation nodes would be provided.

However, in scenario 700 all four items are classified as having a non-essential status. Additionally, data shows that shipment from node groupings 710, 706 is possible with the same shipping expenses as shipping from closer (to the destination 702) node grouping 704. In this scenario, the nodes of node grouping 704 have a high capacity for the particular items (meaning, for example, that they require and/or can accommodate more of the item in stock for local deliveries and in-store purchases).

In scenario 700, a ship methods application may call an ATP application to determine the 40 closest nodes that have all four items available within a predetermined distance of the destination as described herein and an INI application may provide 10 nodes that have all four items available as described herein, so that up to 50 possible consolidation nodes may be provided.

A promise consolidation application and/or ship methods application may then evaluate the up to 50 possible nodes to determine if any should be selected as a final consolidated shipping option to a user/purchaser of the items, and if a discount should be provided along with a selected option. In this scenario, this evaluation may include performing distance clustering and application of business rules/filters as well as cost analysis. In this scenario, the promise consolidation application may filter out nodes from the high-capacity node grouping 704 and include in its analysis the cost-effective nodes from node groupings 710, 706. Because node groupings 710, 706 are farther from destination 702 (see areas 712, 714), a selected consolidation option may have a longer shipping time. A discount may be provided to the user to compensate for this longer shipping time.

Figure 7B:
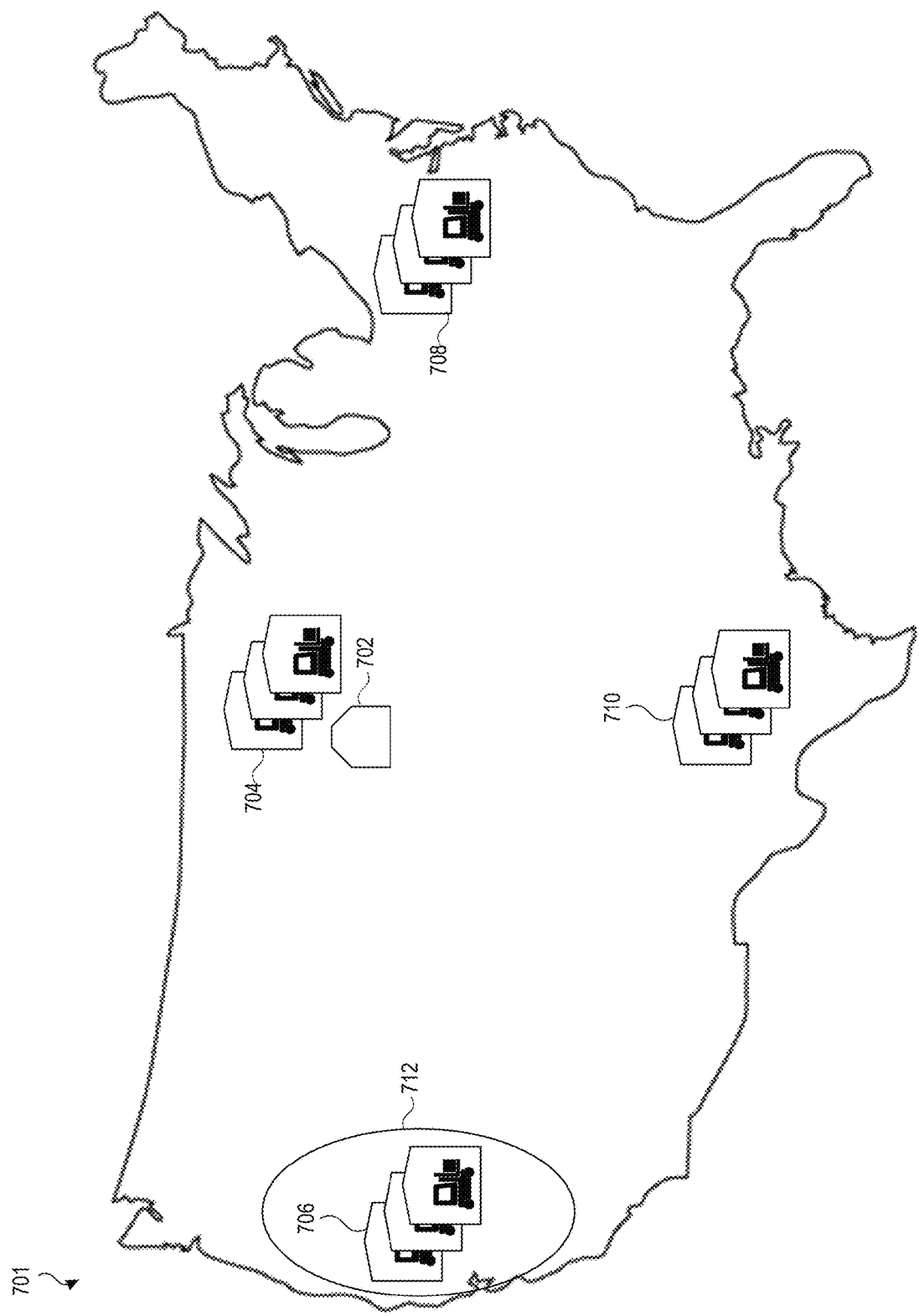
FIG. 7B illustrates an example scenario for consolidation of one or more items to be delivered to a destination, within the example distribution system of FIG. 1.

FIG. 7B illustrates an example scenario 701 for consolidation of one or more items to be delivered to a destination 702. The particular example illustrated in scenario 701 the same shipping nodes, node groupings, and geographic areas as scenario 700. As with scenario 700, in scenario 701, a user has selected four items/products to be shipped to destination 702, all 4 items are available at all nodes 1 to 400, and all items are classified as having a non-essential status.

In scenario 701, if available computing power/capability limits the number of evaluated nodes (for example, 40 in this particular example), and only the closest 40 nodes are evaluated, because all four items are available at all nodes, 40 possible consolidation nodes would be provided.

However, in scenario 701, the inventory levels of Item 1 are low in node groupings 704, 708, and 710, and the inventory levels of Item 1 are higher in node grouping 706.

In scenario 700, a ship methods application may call an ATP application to determine the 40 closest nodes that have all four items available within a predetermined distance of the destination as described herein and an INI application may provide 10 nodes that have all four items available as described herein, so that up to 50 possible consolidation nodes may be provided.

A promise consolidation application and/or ship methods application may then evaluate the up to 50 possible nodes to determine if any should be selected as a final consolidated shipping option to a user/purchaser of the items, and if a discount should be provided along with a selected option. In this scenario, this evaluation may include performing distance clustering and application of business rules/filters as well as cost analysis. In this scenario, the promise consolidation application may filter out nodes from the nodes with low inventories of Item 1 (704, 708, 710) and prioritize instead the nodes from node grouping 706. Because node grouping 706 is farther from destination 702 (see area 712), a selected consolidation option may have a longer shipping time. A discount may be provided to the user to compensate for this longer shipping time.

Figure 8:
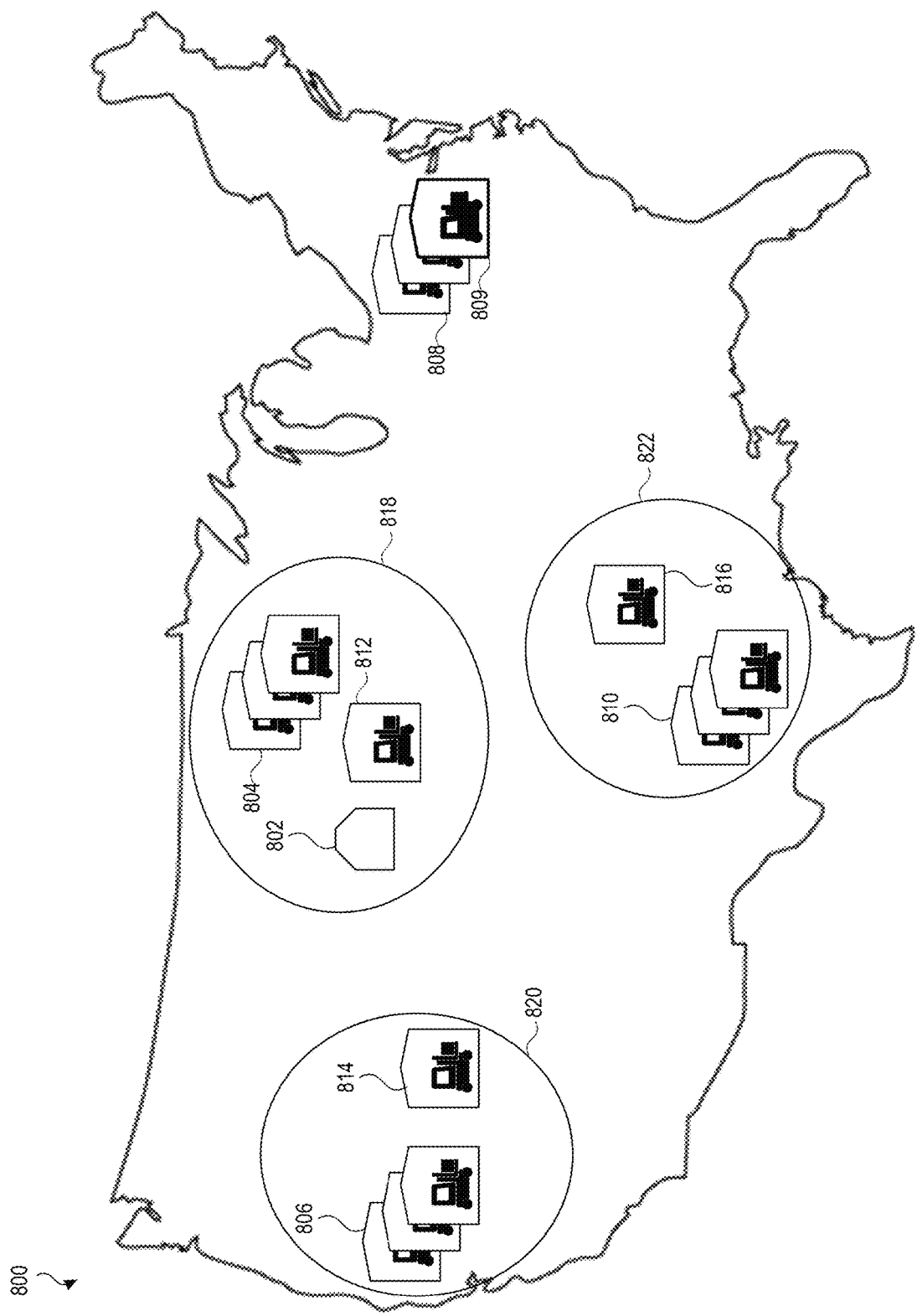
FIG. 8 illustrates an example scenario for consolidation of one or more items to be delivered to a destination, within the example distribution system of FIG. 1.

FIG. 8 illustrates an example scenario 800 for consolidation of one or more items to be delivered to a destination 802. The particular example illustrated in scenario 800 considers shipping nodes located across a geographic area, particularly node groupings 804, 806, 808, 810. In the depicted example (which is not to scale), node grouping 804 represents the nodes closest in geographical distance to the destination 802 (for example, the closest 40 nodes); node grouping 806 represents the next closest nodes by geographical distance from the destination 802 (for example, nodes 41 to 200); node grouping 808 represents the next closest nodes by geographical distance from the destination 802 (for example, nodes 201 to 300); and node grouping 810 represents the next closest nodes by geographical distance from the destination 802 (for example, nodes 301 to 400). One or more groupings may include a sortation center that services its area. For example, node grouping 804 may reside in area 818, serviced by sortation center 812; node grouping 806 may reside in area 820, serviced by sortation center 814; and node grouping 810 may reside in area 822, serviced by sortation center 816. Although these numbers of nodes and node grouping locations are described in this particular example, other numbers and locations of nodes may be contemplated.

In scenario 800, a user has selected four items/products to be shipped to destination 802. Each of the four items are available at various nodes in various node groupings of the total nodes 1 to 400.

In scenario 800, if available computing power/capability limits the number of evaluated nodes (for example, 40 in this particular example), and only the closest 40 nodes are evaluated, because all four items are available at all nodes, 40 possible consolidation nodes would be provided. In this scenario, the nodes considered and evaluated as possible consolidation nodes include sortation centers.

However, in scenario 800, only one individual node 809 of node grouping 808 has all four items in stock and available for shipping. In this scenario, node groupings 804, 806, and 810 include no individual nodes that can provide all four items from a single node. Node groupings 804, 806, and 810 can provided consolidated shipping from single sortation centers 812, 814, 816, respectively, with the items being sourced from two or more nodes within the node grouping and then being processed into one consolidated shipment at the sortation center for the node grouping.

In scenario 800, a ship methods application may call an ATP application to determine the 40 closest nodes (including sortation centers) that have all four items available within a predetermined distance of the destination as described herein and an INI application may provide 10 nodes (including sortation centers) that have all four items available as described herein, so that up to 50 possible consolidation nodes may be provided.

A promise consolidation application and/or ship methods application may then evaluate the up to 50 possible nodes to determine if any should be selected as a final consolidated shipping option to a user/purchaser of the items, and if a discount should be provided along with a selected option. In this scenario, this evaluation may include performing distance clustering and application of business rules/filters as well as cost analysis. In this scenario, the promise consolidation application may filter out sortation center nodes and prioritize single consolidation nodes (such as node 809). Because node 809 is farther from destination 802, a selected consolidation option may have a longer shipping time. A discount may be provided to the user to compensate for this longer shipping time.

Figure 9:
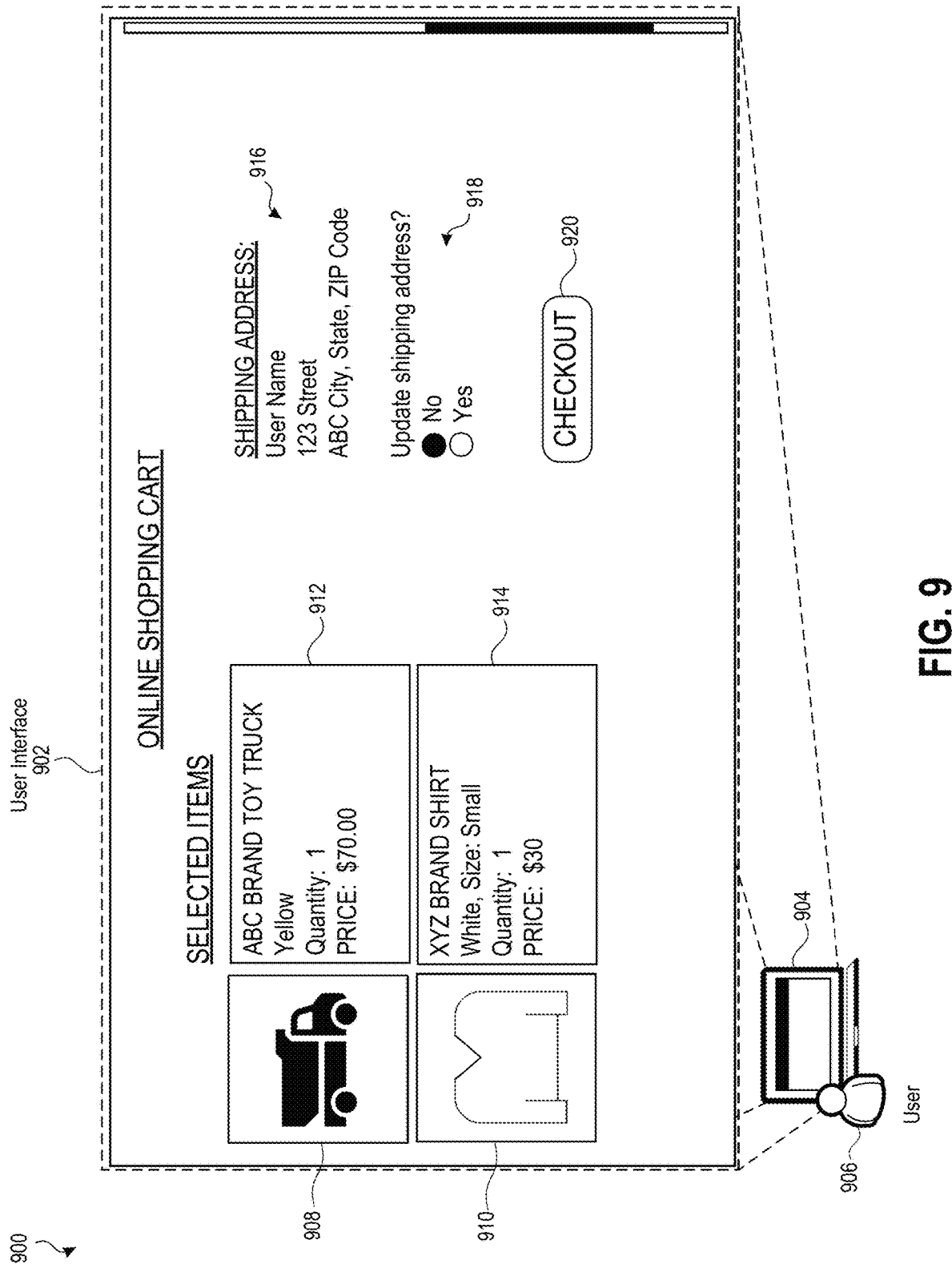
FIG. 9 illustrates an example online shopping cart user interface, according to an example.

FIG. 9 illustrates an example online shopping cart user interface 900. The online shopping cart user interface 900 may be generated at the system 200, for example using user interface services 202 of FIG. 2.

In some examples, a display device 906 may display a user interface 902. The device 904 may be accessible to a user 906 (for example, a user such as user 206 as described with reference to FIG. 2). User 906 may view information displayed on user interface 902 and may interact with user interface 902 utilizing a keyboard, mouse touchpad, touchscreen, remote, voice command, or other interactive methods. In some examples, device 904 may be an example of device 204. In some examples, user interface 902 may include one or more content panels (for example, content panels 908, 910, 912, 914, 916, 918) which display information and/or contain buttons/links that the user 906 may interact with.

In the example illustrated, user interface 902 displays an online shopping cart. The online shopping cart includes a summary of the selected items within the cart. In the particular example shown, there are two items in the online shopping cart. A thumbnail image of each item 908, 910 is displayed, as is a corresponding content panel 912, 914 including summary information relating to each item. The summary information may include a title, characteristics (especially characteristics chosen by the user 906, such as size, color, style, etc.), quantity, and/or cost.

The online shopping cart page may also include a shipping address 916 of the user, in examples where the shipping address is known or estimated (for example, where user 906 has signed into an account with an associated shipping address). In other examples, the online shopping cart page may not include a shipping address, and the user 906 may be prompted to enter a shipping address at a later step if the user 906 chooses to purchase the items. If a shipping address is displayed, the user interface 902 may include an option 918 for the user 906 to update or change the address, for example by selecting radio buttons, clicking a button, selecting a dropdown option, or other interaction.

User interface 902 may also include a checkout button 920 (or similar selection interface feature) whereby the user 906 may initiate the process of purchasing the selected items within the online cart.

Figure 10:
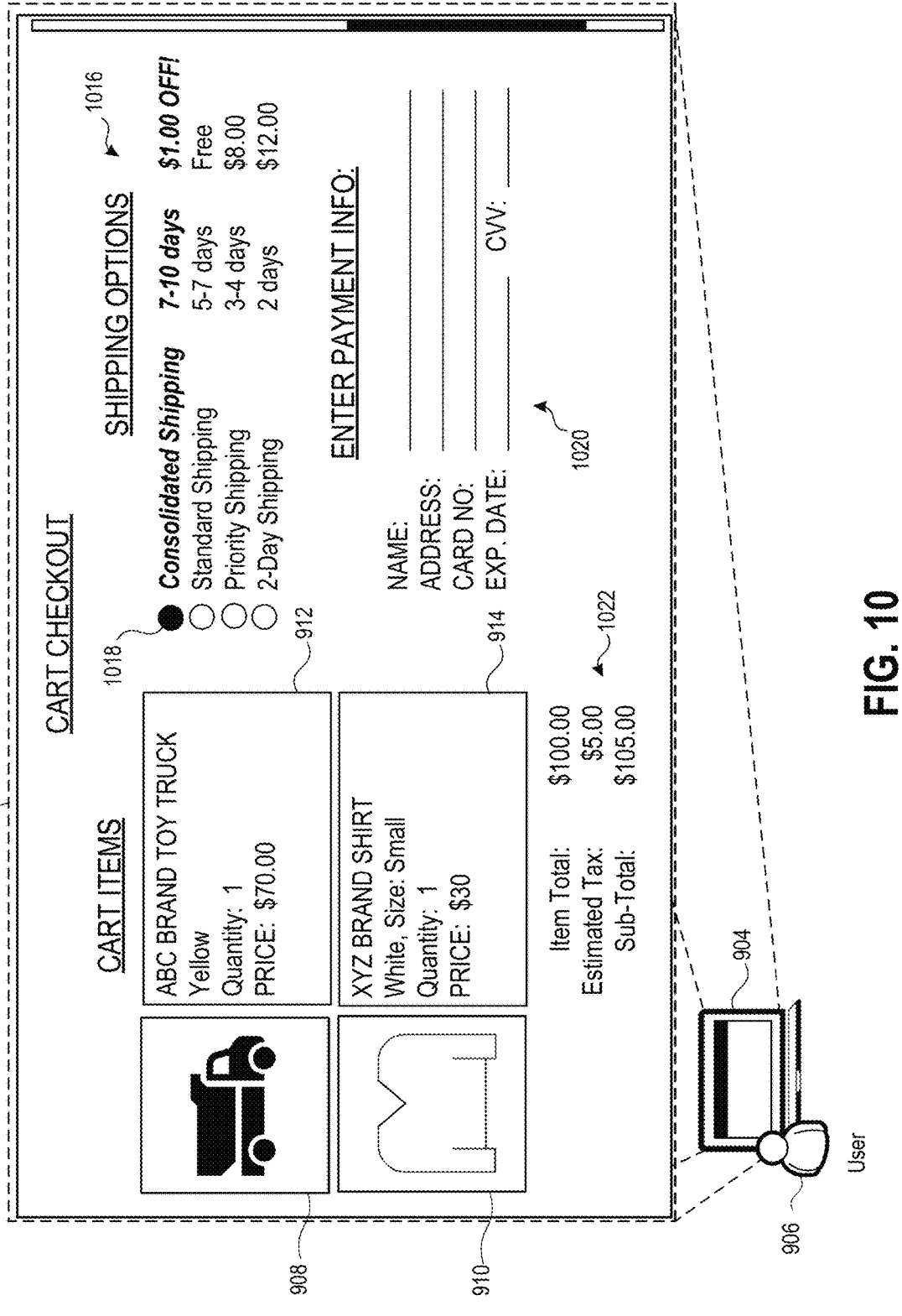
FIG. 10 illustrates an example online shopping cart checkout user interface, according to an example.

FIG. 10 illustrates an example online shopping cart checkout user interface 1000. The online shopping cart checkout user interface 1000 may be generated at the system 200, for example using user interface services 202 of FIG. 2.

In some examples, a display device 904 may display a user interface 1002. The device 1004 may be accessible to a user 906 (for example, a user such as user 206 as described with reference to FIG. 2). User 906 may view information displayed on user interface 1002 and may interact with user interface 1002 utilizing a keyboard, mouse touchpad, touchscreen, remote, voice command, or other interactive methods. In some examples, device 904 may be an example of device 204. In some examples, user interface 1002 may include one or more content panels (for example, content panels 908, 910, 912, 914, 1016, 1018, 1018, 1020, 1022) which display information and/or contain buttons/links that the user 906 may interact with.

In the example illustrated, user interface 1002 displays an online shopping cart checkout. In some examples, this page is initiated by a user 906 checking a purchase or checkout option on a previous webpage (for example, user interface 902).

The user interface 1002 may include summary information 912, 914 and/or thumbnail images 908, 910 of the items within the online cart to be purchased. User interface 1002 may also include a preliminary sub-total cost summary 1022. In some examples, the preliminary sub-total cost summary 1022 may include the total cost of the items, the estimated tax, and the sub-total purchase cost.

The user interface 1002 may include a shipping address or location for the user 906 to add a shipping address, if this was not already entered at a previous page. In some examples, user interface 1002 includes a selection of shipping options 1016, that are selectable by the user 906 (for example, by selection of radio buttons, a drop-down menu, or other interactive selection feature). In some examples, a variety of shipping options are presented, including the type of shipping, the estimated delivery time/duration, and the cost. In the particular example shown, the user 906 may select from: standard shipping, which arrives in 7-10 days, and is free; Priority shipping, which arrives in 3 to 4 days and costs $8.00; 2-Day shipping, which arrives in 2 days and costs $12.00; and a consolidated shipping option 1018, which arrives in 7 to ten days, and which provides a $1.00 discount off of the price of the online cart checkout order. In some examples, all or some of these shipping options 1016 may be shown, and additional shipping options may also or alternatively be shown. The cost values shown (for items, tax, and shipping option costs) are intended to be exemplary and may be different in other examples.

In some examples, the user interface 1002 may include a payment information entry panel 1020 that the user 1020 may interact with (for example, select from dropdowns, type in text boxes, etc.) in order to enter payment information such as credit card information and billing address information.

Figure 11:
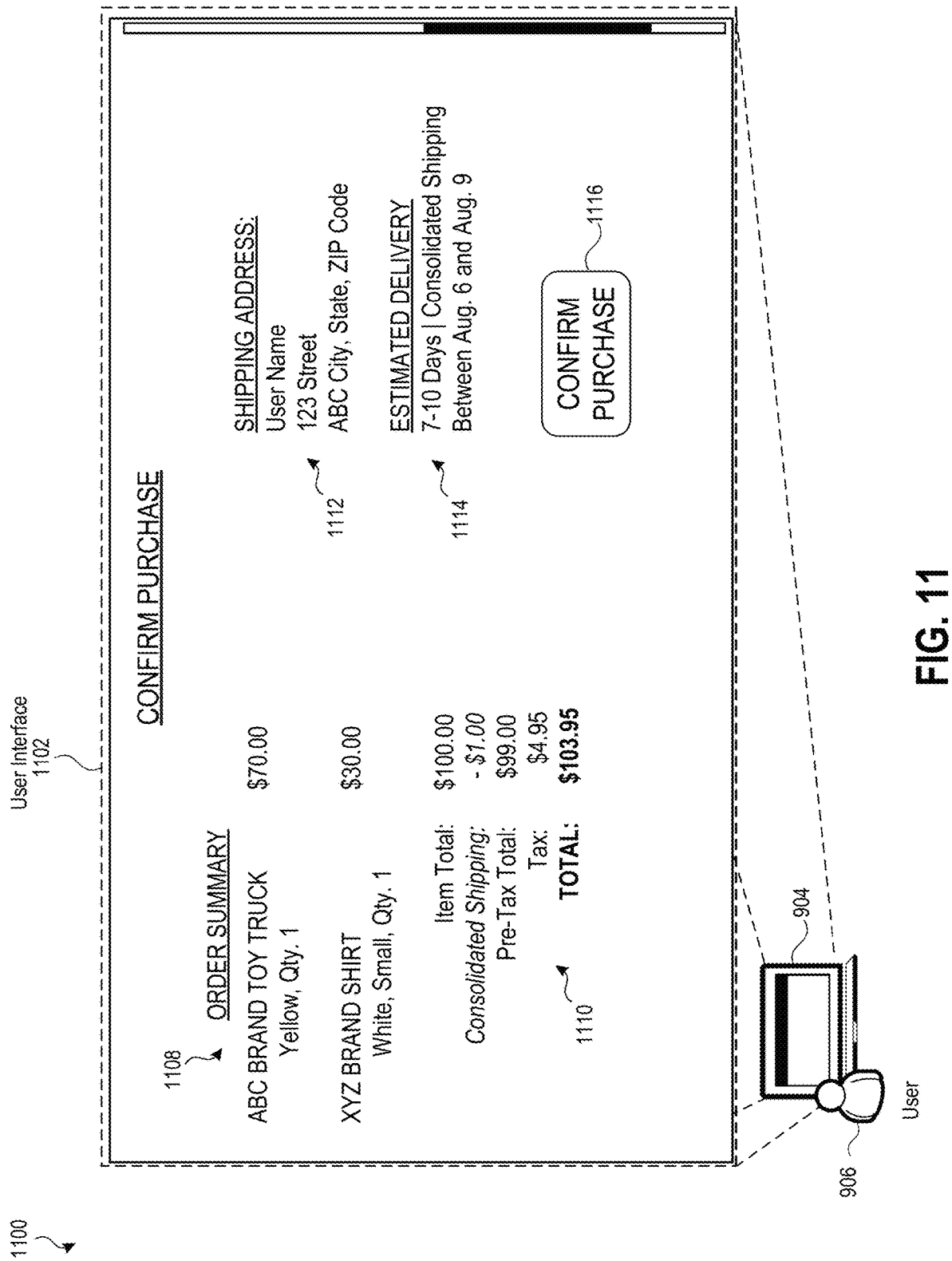
FIG. 11 illustrates an example online purchase confirmation user interface, according to an example.

FIG. 11 illustrates an example online purchase confirmation user interface 1100. The online purchase confirmation user interface 1100 may be generated at the system 200, for example using user interface services 202 of FIG. 2.

In some examples, a display device 904 may display a user interface 1102. The device 904 may be accessible to a user 906 (for example, a user such as user 206 as described with reference to FIG. 2). User 906 may view information displayed on user interface 1102 and may interact with user interface 1102 utilizing a keyboard, mouse touchpad, touchscreen, remote, voice command, or other interactive methods. In some examples, device 904 may be an example of device 204.

In some examples, user interface 1102 may include one or more content panels (for example, content panels 1108, 1110, 1112, 1114) which display information and/or contain buttons/links that the user 906 may interact with.

In the example illustrated, user interface 1102 displays a purchase confirmation screen, whereby user 906 can review order summary information 1108, cost/price information 1110, shipping address information 1112, estimated delivery/shipment method information 114, and can confirm and submit the purchase for billing.

Order summary information 1108 may include item cost, name, characteristics, quantity, and/or other information. Cost/price information 1110 may include item cost total, discounts/rebates/coupons, tax, shipping costs, various subtotals, and/or the overall total cost owed by user 906 for purchase of the items. In the particular example shown, the cost/price information 1110 includes the total cost of the items, a $1.00 discount off of the item price because a consolidated shipping method was selected, a pre-tax total, a tax amount, no shipping cost (because consolidated shipping was selected), and the total cost.

Shipping address information 1112 may display the shipping address as previously entered/selected by user 906 for the destination that the items will be delivered to. Estimated delivery panel 1114 may include the estimated shipping timeframe, estimated delivery date (or range of dates), and/or the name of the selected shipping option. The particular example shown illustrates that a consolidated shipping option was shown, the shipping is estimated to take 7-10 days, and the delivery of the consolidated items to the destination is estimated to occur on or between August 6 and August 9.

User interface 1102 may include a confirm purchase (or submit purchase, etc.) button or other interactive feature for a user 906 to interact with (for example, click on) in order to finalize the purchase of the items. Once the item purchase is finalized, the payment method of the user 906 will be charged. Additionally, after the item purchase is finalized, instructions can be sent to the node(s) preparing the item for shipping to begin the preparation (for example, gathering from stock and packaging at the node) and shipment (for example, scheduling pick-up, delivery, and sortation routes).

In some examples, after confirming the purchase, an additional user interface is displayed that summarizes the purchase transaction (e.g. a receipt). In some examples, after the purchase is confirmed, user profile information associated with user 906 may be updated (for example, purchase history, address, payment method, time of purchase, etc.). In some examples, after the items have been picked up by a courier from the node for shipment to the destination, a an additional user interface is made available to the user 906 that includes package tracking information and updated estimated delivery dates.

Figure 12:
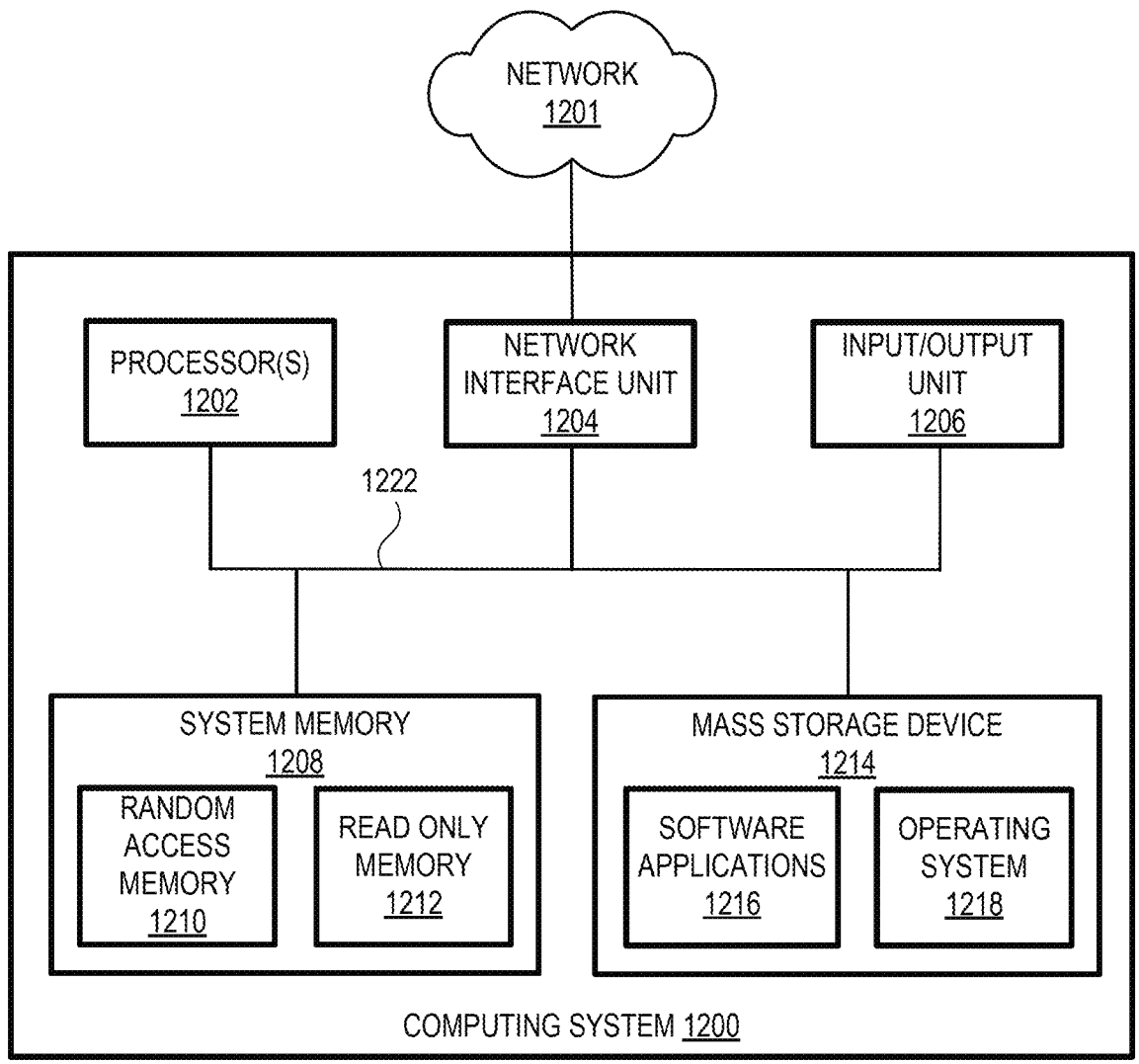
FIG. 12 illustrates an example block diagram of a computing system.

FIG. 12 illustrates an example block diagram of a virtual or physical computing system 1200. One or more aspects of the computing system 1200 can be used to implement the systems described herein, store instructions described herein, and preform operations described herein.

In the embodiment shown, the computing system 1200 includes one or more processors 1202, a system memory 1208, and a system bus 1222 that couples the system memory 1208 to the one or more processors 1202. The system memory 1208 includes RAM (Random Access Memory) 1210 and ROM (Read-Only Memory) 1212. A basic input/output system that contains the basic routines that help to transfer information between elements within the computing system 1200, such as during startup, is stored in the ROM 1212. The computing system 1200 further includes a mass storage device 1214. The mass storage device 1214 is able to store software instructions and data. The one or more processors 1202 can be one or more central processing units or other processors.

The mass storage device 1214 is connected to the one or more processors 1202 through a mass storage controller (not shown) connected to the system bus 1222. The mass storage device 1214 and its associated computer-readable data storage media provide non-volatile, non-transitory storage for the computing system 1200. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1200.

According to various embodiments of the invention, the computing system 1200 may operate in a networked environment using logical connections to remote network devices through the network 1201. The network 1201 is a computer network, such as an enterprise intranet and/or the Internet. The network 1201 can include a LAN, a Wide Area Network (WAN), the Internet, wireless transmission mediums, wired transmission mediums, other networks, and combinations thereof. The computing system 1200 may connect to the network 1201 through a network interface unit 1204 connected to the system bus 1222. It should be appreciated that the network interface unit 1204 may also be utilized to connect to other types of networks and remote computing systems. The computing system 1200 also includes an input/output controller 1206 for receiving and processing input from a number of other devices, including a touch user interface display screen, or another type of input device. Similarly, the input/output controller 1206 may provide output to a touch user interface display screen or other type of output device.

As mentioned briefly above, the mass storage device 1214 and the RAM 1210 of the computing system 1200 can store software instructions and data. The software instructions include an operating system 1218 suitable for controlling the operation of the computing system 1200. The mass storage device 1214 and/or the RAM 1210 also store software instructions, that when executed by the one or more processors 1202, cause one or more of the systems, devices, or components described herein to provide functionality described herein. For example, the mass storage device 1214 and/or the RAM 1210 can store software instructions that, when executed by the one or more processors 1202, cause the computing system 1200 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A computing system, comprising:
at least one processor; and
at least one memory storing computer-executable instructions for generating a consolidation shipping option, the computer-executable instructions when executed by the at least one processor causing the computer to:
precompute an item availability at each of a plurality of nodes;
store the precomputed item availability in a forward cache;
receive input data from a user interface accessible from a user computing device, the input data indicating that:
an online cart includes at least a first item and a second item; and
a common shipping destination for a plurality of items;
locate a first predetermined number of nodes of an overall list of eligible nodes, wherein the first predetermined number of nodes are within a predetermined distance of the common shipping destination;
for the first item, identify in real-time a first set of nodes within the predetermined distance that has the first item in stock, based the stored precomputed item availability in the forward cache;
for the second item, identify in real-time a second set of nodes within the predetermined distance that has the second item in stock, based on the stored precomputed item availability in the forward cache;
determine, based on the first set of nodes within the predetermined distance and the second set of nodes within the predetermined distance, a first common list of nodes that have both the first item and the second item in stock;
from the overall list of eligible nodes, select, in real-time at a consolidation application, a second common list of nodes that has both the first item and the second item in stock, based at least in part on the stored precomputed item availability in the forward cache, wherein the second common list of nodes includes a second predetermined number of nodes;
combine the first common list of nodes and the second common list of nodes into a third common list of nodes;
sort, at the consolidation application, the third common list of nodes by distance cluster;
apply, at the consolidation application, one or more business rules to third common list of nodes, wherein the one or more business rules is based on information received from one or more business groups;
based at least on the distance cluster and the business rules, determine whether any nodes of the third common list of nodes can provide delivery of both the first item and the second item within a predetermined delivery time threshold;
when a local subset of nodes of the third common list of nodes has at least one of a first item capacity and a second item capacity below a capacity limit threshold, determine that a first non-local subset of nodes of the third common list of nodes has at least one of a first item capacity and a second item capacity below a capacity limit threshold and determine that a second non-local subset of nodes of the third common list of nodes has both the first item capacity and the second item capacity above a capacity limit threshold to select the consolidation node from among the second non-local subset of nodes;
upon determination that at least one node of the third common list of nodes can provide delivery of both the first item and the second item within the predetermined delivery time threshold, generate the consolidation shipping option; and
transmit the consolidation shipping option to the user computing device for display on the user interface.

2. The computing system of claim 1, further comprising instructions to:
receive a user input from the user computing device that the user has selected the consolidation shipping option; and
select a consolidation node from the third common list of nodes.

3. The computing system of claim 2, further comprising instructions to:
generate a consolidation discount for display on the user interface.

4. The computing system of claim 1, wherein the input data further indicates that a user has selected a checkout option for the online cart.

5. The computing system of claim 1, wherein applying the one or more business rules comprises:
receive the one or more business rules from at least one business group; and
include the one or more filters in applying the one or more business rules, wherein each of the one or more filters is assigned a priority.

6. The computing system of claim 1, further comprising instructions to:
receive machine learning input information at a machine learning application; and
update stored data values, by the machine learning application,
wherein selection of the second common list of nodes depends at least partially on the updated stored data values, and
wherein determining that at least one node of the third common list of nodes can provide delivery of both the first item and the second item within the predetermined delivery time threshold depends at least partially on the updated stored data values.

7. A method, comprising:
precomputing an item availability at each of a plurality of nodes;
storing the precomputed item availability in a forward cache;
receiving input data from a user interface accessible from a user computing device, the input data indicating that:
an online cart includes at least a first item and a second item; and
a common shipping destination for a plurality of items;
locating a first predetermined number of nodes of an overall list of eligible nodes, wherein the first predetermined number of nodes are within a predetermined distance of the common shipping destination;
for the first item, identifying in real-time a first set of nodes within the predetermined distance that has the first item in stock, based on the stored precomputed item availability in the forward cache;
for the second item, identifying in real-time a second set of nodes within the predetermined distance that has the second item in stock, based on the stored precomputed item availability in the forward cache;
determining, based on the first set of nodes within the predetermined distance and the second set of nodes within the predetermined distance, a first common list of nodes that have both the first item and the second item in stock;

from the overall list of eligible nodes, selecting, in real-time at a consolidation application, a second common list of nodes that has both the first item and the stored item in stock, based at least in part on the stored precomputed item availability in the forward cache, wherein the second common list of nodes includes a second predetermined number of nodes;

combining the first common list of nodes and the second common list of nodes into a third common list of nodes;

sorting, at the consolidation application, the third common list of nodes by distance cluster;

applying, at the consolidation application, one or more business rules to third common list of nodes, wherein the one or more business rules is based on information received from one or more business groups;

based at least on the distance cluster and the business rules, determining whether any nodes of the third common list of nodes can provide delivery of both the first item and the second item within a predetermined delivery time threshold;

when a local subset of nodes of the third common list of nodes has at least one of a first item capacity and a second item capacity below a capacity limit threshold, determining that a first non-local subset of nodes of the third common list of nodes has at least one of a first item capacity and a second item capacity below a capacity limit threshold and determine that a second non-local subset of nodes of the third common list of nodes has both the first item capacity and the second item capacity above a capacity limit threshold to select the consolidation node from among the second non-local subset of nodes;

upon determination that at least one node of the third common list of nodes can provide delivery of both the first item and the second item within the predetermined delivery time threshold, generating a consolidation shipping option; and transmitting the consolidation shipping option to the user computing device for display on the user interface.

8. The method of claim 7, wherein applying the one or more business rules comprises:
receiving the one or more business rules from at least one business group; and
applying one or more filters, the one or more filters being included in the one or more business rules, wherein each of the one or more filters is assigned a priority.

9. The method of claim 7, further comprising:
receiving a user input from the user computing device that the user has selected the consolidation shipping option; and
selecting a consolidation node from the third common list of nodes.

10. The method of claim 9, wherein selecting the consolidation node from the third common list of nodes comprises:
receiving an item non-essential label for both the first item and the second item;
determining that a local subset of nodes of the third common list of nodes has at least one of a first item capacity and a second item capacity below a capacity limit threshold;
determining that a non-local subset of nodes of the third common list of nodes has both the first item capacity and the second item capacity above a capacity limit threshold; and
selecting the consolidation node from among the non-local subset of nodes.

11. The method of claim 9, wherein selecting the consolidation node from the third common list of nodes comprises:
determining that a local subset of nodes of the third common list of nodes includes a first sortation center;
determining that a first non-local subset of nodes of the third common list of nodes includes a second sortation center;
determining that a second non-local subset of nodes of the third common list of nodes includes a single non-sortation center node; and
selecting the single non-sortation center node to be the consolidation node.

12. The method of claim 7, further comprising: generating a consolidation discount for display on the user interface.

13. The method of claim 7, wherein the input data further indicates that a user has selected a checkout option for the online cart.

14. The method of claim 7, further comprising:
receiving an instruction from the user interface to ship both the first item and the second item according to the consolidation shipping option;
tracking shipment performance information relating to the first item and the second item;
and storing the shipment performance information in a shipment performance information database.

15. The method of claim 7, further comprising:
receiving machine learning input information at a machine learning application; and
updating stored data values, by the machine learning application,
wherein selection of the second common list of nodes depends at least partially on the updated stored data values, and
wherein determining that at least one node of the third common list of nodes can provide delivery of both the first item and the second item within the predetermined delivery time threshold depends at least partially on the updated stored data values.

16. The method of claim 15, wherein the machine learning input information comprises one or more of:
node performance;
carrier performance;
user profile information;
inventory availability;
market levers; and
item information.

17. The method of claim 15, wherein the stored data values comprise one or more of:
node information;
node location information;
item data;
inventory data; and
origin-destination pair information.

18. A system comprising:
a distance-based item availability platform comprising a first computer system configured to:
precompute an item availability at each of a plurality of nodes;
store the precomputed item availability in a forward cache;
receive input data from a user interface accessible from a user computing device,
the input data indicating that:
an online cart includes at least a first item and a second item; and a common shipping destination for a plurality of items;

locate a first predetermined number of nodes of an overall list of eligible nodes,
wherein the first predetermined number of nodes are within a predetermined distance of the common shipping destination;
for the first item, identify in real-time a first set of nodes within the predetermined distance that has the first item in stock, based on the stored precomputed item availability in the forward cache;
for the second item, identify in real-time a second set of nodes within the predetermined distance that has the second item in stock, based on the stored precomputed item availability in the forward cache;
determine, based on the first set of nodes within the predetermined distance and the second set of nodes within the predetermined distance, a first common list of nodes that have both the first item and the second item in stock; and
a consolidation node selection platform, executing on a second computer system communicatively connected to the first computer system, instructions to:
receive the first common list of nodes from the first computer system;
from the overall list of eligible nodes, select, in real-time at a consolidation application, a second common list of nodes that has both the first item and the second item in stock, based at least in part on the stored precomputed item availability in the forward cache, wherein the second common list of nodes includes a second predetermined number of nodes;
combine the first common list of nodes and the second common list of nodes into a third common list of nodes;
sort, at the consolidation application, the third common list of nodes by distance cluster;
apply, at the consolidation application, one or more business rules to third common list of nodes, wherein the one or more business rules is based on information received from one or more business groups;
based at least on the distance cluster and the business rules, determine whether any nodes of the third common list of nodes can provide delivery of both the first item and the second item within a predetermined delivery time threshold;
when a local subset of nodes of the third common list of nodes has at least one of a first item capacity and a second item capacity below a capacity limit threshold,
determine that a first non-local subset of nodes of the third common list of nodes has at least one of a first item capacity and a second item capacity below a capacity limit threshold and determine that a second non-local subset of nodes of the third common list of nodes has both the first item capacity and the second item capacity above a capacity limit threshold to select the consolidation node from among the second non-local subset of nodes;
upon determination that at least one node of the third common list of nodes can provide delivery of both the first item and the second item within the predetermined delivery time threshold, generate a consolidation shipping option; and
transmit the consolidation shipping option to the user computing device for display on the user interface.

19. The system of claim 18, further comprising a machine learning platform, executing on a third computer system communicatively connected to the first and second computer systems, instructions to:
receive machine learning input information at a machine learning application; and
update stored data values, by the machine learning application,
wherein selection of the second common list of nodes depends at least partially on the updated stored data values, and
wherein determining that at least one node of the third common list of nodes can provide delivery of both the first item and the second item within the predetermined delivery time threshold depends at least partially on the updated stored data values.

20. The system of claim 19 wherein the updated stored data values include product information, node location information, and origin-destination pair information, and
wherein the one or more business rules are based at least partially on the updated stored data values.

21. The system of claim 19, wherein updating the stored data values occurs on a real-time basis.

22. The system of claim 19, wherein applying the one or more business rules comprises selecting the consolidation node from the third common list of nodes comprises:
determining that a local subset of nodes of the third common list of nodes has at least one of a first item capacity and a second item capacity below a capacity limit threshold;
determining that a first non-local subset of nodes of the third common list of nodes has at least one of a first item capacity and a second item capacity below a capacity limit threshold.

* * * * *